US011356293B2

(12) United States Patent
Mo et al.

(10) Patent No.: US 11,356,293 B2
(45) Date of Patent: Jun. 7, 2022

(54) CANOPEN-BASED TRAIN NETWORK DATA TRANSMISSION METHOD, SYSTEM AND APPARATUS

(71) Applicant: BYD COMPANY LIMITED, Shenzhen (CN)

(72) Inventors: Junsheng Mo, Shenzhen (CN); Wenxiao Zeng, Shenzhen (CN); Long Zhao, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 227 days.

(21) Appl. No.: 16/625,438

(22) PCT Filed: Jun. 20, 2018

(86) PCT No.: PCT/CN2018/092048
§ 371 (c)(1),
(2) Date: Dec. 20, 2019

(87) PCT Pub. No.: WO2018/233643
PCT Pub. Date: Dec. 27, 2018

(65) Prior Publication Data
US 2021/0152391 A1    May 20, 2021

(30) Foreign Application Priority Data

Jun. 21, 2017    (CN) .......................... 201710476532.6

(51) Int. Cl.
*H04L 12/40* (2006.01)
*H04L 41/0663* (2022.01)
*H04L 43/10* (2022.01)

(52) U.S. Cl.
CPC .... *H04L 12/40202* (2013.01); *H04L 41/0663* (2013.01); *H04L 43/10* (2013.01);
(Continued)

(58) Field of Classification Search
CPC .......... G06F 13/00; G06F 13/42; G06F 13/38; G06F 13/4204; G06F 13/4247;
(Continued)

(56) References Cited

U.S. PATENT DOCUMENTS 7,457,236 B2 * 11/2008 Cheng ................. H04L 43/0817
370/220
8,473,774 B2 * 6/2013 Hikabe ............... H04L 41/0668
714/3

(Continued)

FOREIGN PATENT DOCUMENTS

CN       101471837 A    7/2009
CN       101598758 A    12/2009
(Continued)

OTHER PUBLICATIONS

The World Intellectual Property Organization (WIPO) International Search Report for PCT/CN2018/092048 dated Sep. 4, 2018 5 Pages.

Primary Examiner — Marsha D Banks Harold
Assistant Examiner — Dharmesh J Patel
(74) Attorney, Agent, or Firm — Anova Law Group, PLLC

(57) ABSTRACT

A CANopen-based train network data transmission method includes: switching, when a first CAN channel of a first slave node is detected as faulty, to a second CAN channel of the first slave node to receive over a standby network a heartbeat packet and data transmitted by another relevant node; monitoring, if no heartbeat packet transmitted by a relevant second slave node is received from the standby network within a preset heartbeat period, by an active master node, in an active network, a heartbeat packet and data transmitted by the second slave node; receiving, through the second CAN channel, the heartbeat packet and the data of the second slave node forwarded by the active master node to the standby network when the active master node detects (Continued)

in the active network the heartbeat packet and the data transmitted by the second slave node through the first CAN channel.

10 Claims, 15 Drawing Sheets

(52) U.S. Cl.
CPC ............... *H04L 2012/40215* (2013.01); *H04L 2012/40293* (2013.01)

(58) Field of Classification Search
CPC ............. G06F 13/4265; G06F 13/4282; G06F 13/4081; H04L 12/40; H04L 12/4015; H04L 12/40013; H04L 12/40026; H04L 12/40176; H04L 12/40182; H04L 12/40195; H04L 12/40202; H04L 41/16; H04L 41/0654; H04L 41/0663; H04L 41/0668; H04L 43/08; H04L 43/10; H04L 43/0811; H04L 43/0817; H04L 43/0852; H04L 2012/40215; H04L 2012/40293
See application file for complete search history.

(56) References Cited

U.S. PATENT DOCUMENTS

| | | | |
|---|---|---|---|
| 9,077,608 B2* | 7/2015 | Zhu | H04L 45/64 |
| 2013/0080585 A1 | 3/2013 | Schaffner et al. | |
| 2013/0332636 A1 | 12/2013 | Han | |
| 2016/0173335 A1* | 6/2016 | Edmiston | H04L 12/40202 370/254 |
| 2017/0339005 A1* | 11/2017 | Yuan | H04L 29/08 |

FOREIGN PATENT DOCUMENTS

| | | |
|---|---|---|
| CN | 101908974 A | 12/2010 |
| CN | 103139060 A | 6/2013 |
| CN | 103516571 A | 1/2014 |
| CN | 204465546 U | 7/2015 |
| CN | 106302064 A | 1/2017 |
| CN | 106656663 A | 5/2017 |
| DE | 102005037723 B4 | 3/2014 |
| KR | 20160024180 A | 3/2016 |
| WO | 2011003457 A1 | 1/2011 |

\* cited by examiner

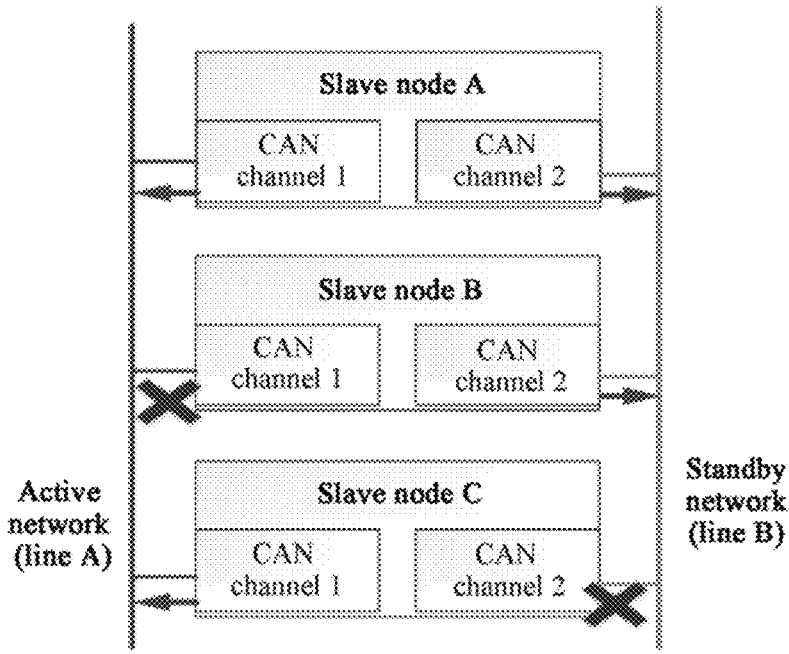

FIG. 2

```
When a first CAN channel of a first slave node is detected as faulty,
switch to a second CAN channel of the first slave node to receive
over a standby network a heartbeat packet and data transmitted by
another relevant node
```
— S101

```
If it is determined that no heartbeat packet transmitted by a relevant
second slave node is received from the standby network within a
preset heartbeat period, learn that a second CAN channel of the
second slave node is faulty, and transmit an information forwarding
request includinga second slave node identifier to the active master
node over the standby network, so that the active master node
monitors, in an active network, a heartbeat packet and data
transmitted by the second slave node through the first CAN channel
```
— S102

```
Receive,through the second CAN channel of the first slave node, the
heartbeat packet and the data of the second slave node that are
forwarded by the active master node to the standby network, when the
active master node detects, in the active network, the heartbeat packet
and the data transmitted by the second slave node through the first
CAN channel
```
— S103

FIG. 3

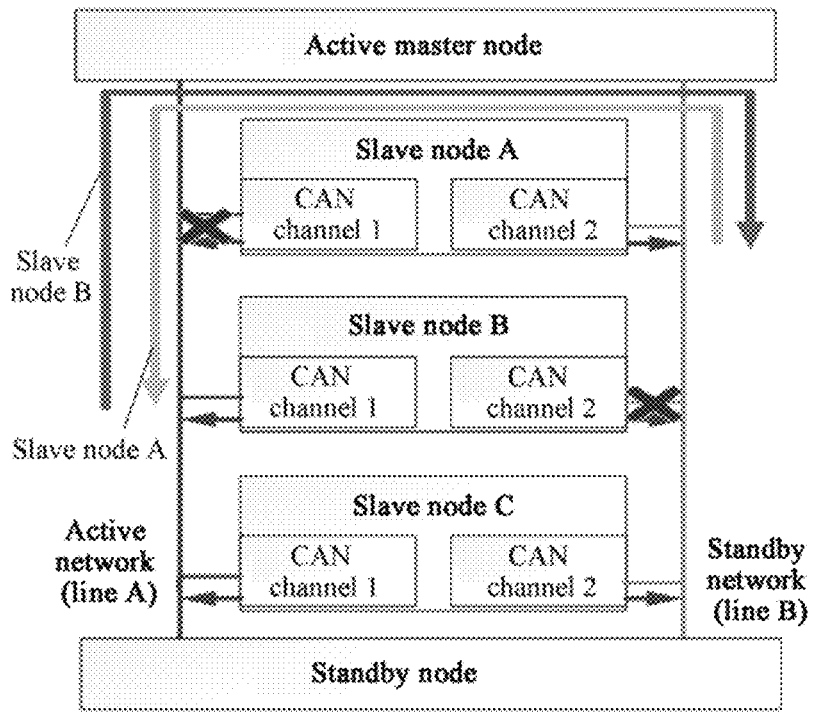

FIG. 4

Receive, through the second CAN channel of the first slave node, a node breakdown message including the second slave node identifier and transmitted by the active master node to the standby network, when no heartbeat packet or data transmitted by the second slave node through the first CAN channel is detected by the active master node in the active network ⎯ S201

Record the node breakdown message of the second slave node ⎯ S202

FIG. 5

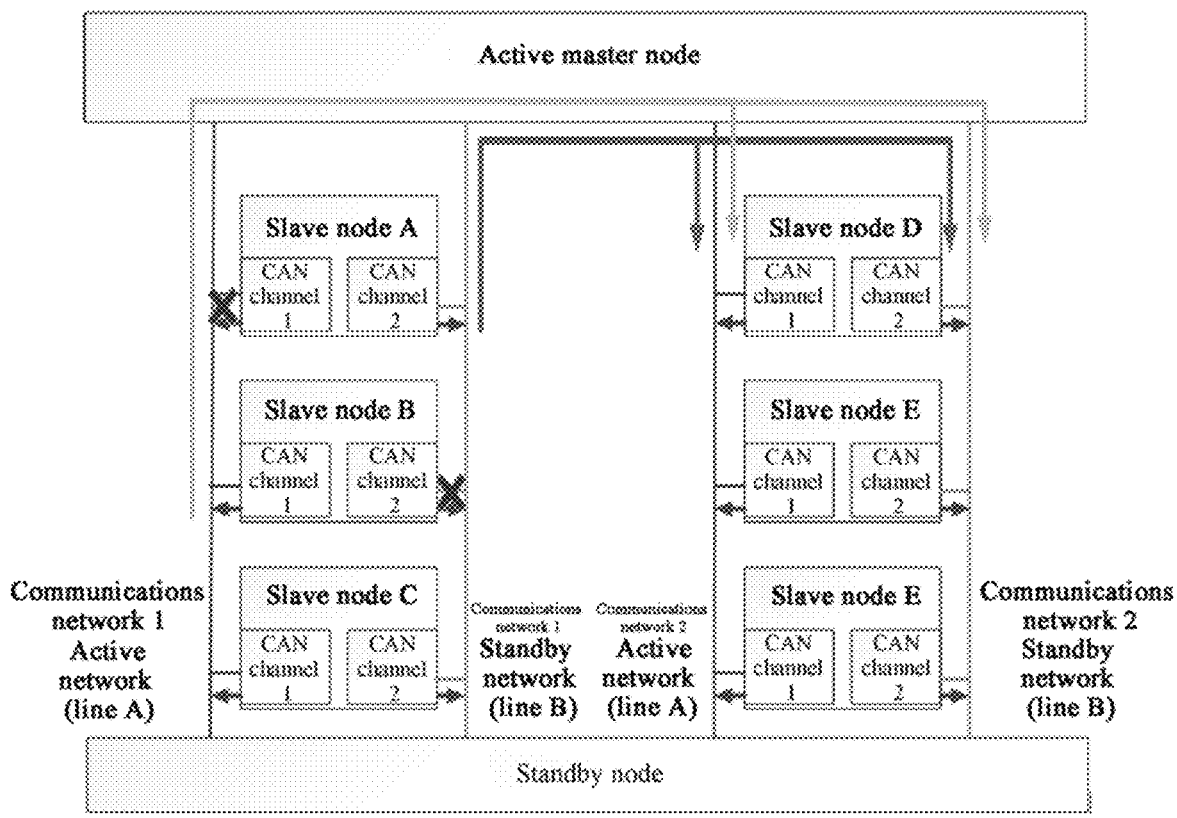

FIG. 9(b)

| | |
|---|---|
| If it is determined that no heartbeat packet transmitted by the relevant first slave node is received from the active network through a first CAN channel of the second slave node within a preset heartbeat period, learn that the first CAN channel of the first slave node is faulty, and detect that the second CAN channel of the second slave node is faulty | S501 |
| Transmit an information forwarding request including a first slave node identifier to the active master node over the active network, so that the active master node monitors, in the standby network, a heartbeat packet and data transmitted by the first slave node through the second CAN channel | S502 |
| Receive, through the first CAN channel of the second slave node, the heartbeat packet and the data of the first slave node that are forwarded by the active master node to the active network, when the active master node detects, in the standby network, the heartbeat packet and the data transmitted by the first slave node through the second CAN channel | S503 |

FIG. 10

CANOPEN-BASED TRAIN NETWORK DATA TRANSMISSION METHOD, SYSTEM AND APPARATUS

CROSS-REFERENCE TO RELATED APPLICATIONS

This application is a national phase entry under 35 U.S.C. § 371 of International Application No. PCT/CN2018/092048, filed on Jun. 20, 2018, which claims priority to Chinese Patent Application No. 201710476532.6, filed by BYD Company Limited on Jun. 21, 2017 and entitled "CANOPEN-BASED TRAIN NETWORK DATA TRANSMISSION METHOD, SYSTEM AND APPARATUS", content of all of which is incorporated herein by reference in its entirety.

FIELD

The present disclosure relates to the field of vehicle communications technologies and, in particular, to a CANopen-based train network data transmission method, system and apparatus.

BACKGROUND

Currently, the technology that is widely applied to a train communications network is a Train Communications Network (TCN) bus technology. A TCN covers four types of buses: multifunction vehicle bus (MVB), wire train bus (WTB), Ethernet bus, and controller area network (CAN) bus. In the design requirements for the four types of buses MVB, WTB, Ethernet, and CAN, a common requirement is network redundancy design. Network redundancy means that a standby network should be established for each communications network. To be specific, each node on the network is connected in a dual-line connection mode that includes a line A and a line B. When the network is faulty, communication can be implemented by the standby network, thereby ensuring smooth exchange of data between all products on the network and high availability of an operating environment of the train communications network.

Generally, if data exchange is performed by using a CAN bus in the design of a train communications network, the design is mostly based on CANopen (which is a high-level communications protocol based on CAN bus, and is currently a commonly used CAN bus in industrial control). The CANopen is defined as a standardized application layer protocol that is designed based on a CAN bus. The CANopen protocol supports a complete network management mechanism for conventional CANs, so as to support the redundancy network design. Currently, all CANopen-based redundancy network designs require that all network nodes should transmit data over two lines simultaneously. However, by default, all the nodes receive the data from only an active network. When one or more slave nodes are offline from the active network, the standby network is switched to, to receive data from the one or more slave nodes.

SUMMARY

The present disclosure is directed to resolving one of the foregoing technical problems at least to some extent. Therefore, a first objective of the present disclosure is to provide a CANopen-based train network data transmission method. The method ensures sound operation of an entire train and improves redundancy effects of a train network.

A second objective of the present disclosure is to provide another CANopen-based train network data transmission method.

A third objective of the present disclosure is to provide still another CANopen-based train network data transmission method.

A fourth objective of the present disclosure is to provide yet another CANopen-based train network data transmission method.

A fifth objective of the present disclosure is to provide a first slave node.

A sixth objective of the present disclosure is to provide an active master node.

A seventh objective of the present disclosure is to provide a second slave node.

An eighth objective of the present disclosure is to provide another active master node.

A ninth objective of the present disclosure is to provide a CANopen-based train network data transmission system.

A tenth objective of the present disclosure is to provide another CANopen-based train network data transmission system.

An eleventh objective of the present disclosure is to provide a computer device.

A twelfth objective of the present disclosure is to provide another computer device.

A thirteenth objective of the present disclosure is to provide still another computer device.

A fourteenth objective of the present disclosure is to provide yet another computer device.

A fifteenth objective of the present disclosure is to provide a storage medium.

A sixteenth objective of the present disclosure is to provide another storage medium.

A seventeenth objective of the present disclosure is to provide still another storage medium.

An eighteenth objective of the present disclosure is to provide yet another storage medium.

To achieve the foregoing objectives, an embodiment in a first aspect of the present disclosure provides a CANopen-based train network data transmission method, including: switching, when a first CAN channel of a first slave node is detected as faulty, to a second CAN channel of the first slave node to receive over a standby network a heartbeat packet and data transmitted by another relevant node; determining, if it is determined that no heartbeat packet transmitted by a relevant second slave node is received from the standby network within a preset heartbeat period, that a second CAN channel of the second slave node is faulty, and transmitting an information forwarding request including a second slave node identifier to the active master node over the standby network, so that the active master node monitors, in an active network, a heartbeat packet and data transmitted by the second slave node through the first CAN channel; and receiving, through the second CAN channel of the first slave node, the heartbeat packet and the data of the second slave node that are forwarded by the active master node to the standby network when the active master node detects in the active network the heartbeat packet and the data transmitted by the second slave node through the first CAN channel.

To achieve the foregoing objectives, an embodiment in a second aspect of the present disclosure provides another CANopen-based train network data transmission method, including: receiving an information forwarding request in a standby network or an active network, where the information forwarding request is transmitted by a first slave node through a second CAN channel and includes a second slave node identifier; monitoring, in the active network, a heartbeat packet and data transmitted through a first CAN channel by a second slave node corresponding to the second slave node identifier; and forwarding the heartbeat packet and the data of the second slave node to the first slave node over the standby network when the heartbeat packet and the data transmitted by the second slave node through the first CAN channel are detected in the active network, so that the first slave node receives the heartbeat packet and the data of the second slave node through the second CAN channel.

To achieve the foregoing objectives, an embodiment in a third aspect of the present disclosure provides still another CANopen-based train network data transmission method, including: determining, if it is determined that no heartbeat packet transmitted by the relevant first slave node is received from the active network through a first CAN channel of the second slave node within a preset heartbeat period, that the first CAN channel of the first slave node is faulty, and detecting that the second CAN channel of the second slave node is faulty; transmitting an information forwarding request including a first slave node identifier to the active master node over the active network, so that the active master node monitors, in the standby network, a heartbeat packet and data transmitted by the first slave node through the second CAN channel; and receiving, through the first CAN channel of the second slave node, the heartbeat packet and the data of the first slave node that are forwarded by the active master node to the active network when the active master node detects in the standby network the heartbeat packet and the data transmitted by the first slave node through the second CAN channel.

To achieve the foregoing objectives, an embodiment in a fourth aspect of the present disclosure provides yet another CANopen-based train network data transmission method, including: receiving an information forwarding request in an active network, where the information forwarding request is transmitted by a second slave node through a first CAN channel and includes a first slave node identifier; monitoring, in a standby network, a heartbeat packet and data transmitted through a second CAN channel by a first slave node corresponding to the first slave node identifier; and forwarding the heartbeat packet and the data of the first slave node to the second slave node over the active network when the heartbeat packet and the data transmitted by the first slave node through the second CAN channel are detected in the standby network, so that the second slave node receives the heartbeat packet and the data of the first slave node through the first CAN channel.

To achieve the foregoing objectives, an embodiment in a fifth aspect of the present disclosure provides a first slave node, including: a first switching module, configured to: switch, when a first CAN channel of a first slave node is detected as faulty, to a second CAN channel of the first slave node to receive over a standby network a heartbeat packet and data transmitted by another relevant node; a first determining module, configured to learn, if it is determined that no heartbeat packet transmitted by a relevant second slave node is received from the standby network within a preset heartbeat period, that a second CAN channel of the second slave node is faulty; a first transmission module, configured to transmit an information forwarding request including a second slave node identifier to the active master node over the standby network, so that the active master node monitors, in an active network, a heartbeat packet and data transmitted by the second slave node through the first CAN channel; and a first receiving module, configured to receive, through the second CAN channel of the first slave node, the heartbeat packet and the data of the second slave node that are forwarded by the active master node to the standby network, when the active master node detects in the active network the heartbeat packet and the data transmitted by the second slave node through the first CAN channel.

To achieve the foregoing objectives, an embodiment in a sixth aspect of the present disclosure provides an active master node, including: a second receiving module, configured to receive an information forwarding request in a standby network or an active network, where the information forwarding request is transmitted by a first slave node through a second CAN channel and includes a second slave node identifier; a first monitoring module, configured to monitor, in the active network, a heartbeat packet and data transmitted through a first CAN channel by a second slave node corresponding to the second slave node identifier; and a first forwarding module, configured to forward the heartbeat packet and the data of the second slave node to the first slave node over the standby network when the heartbeat packet and the data transmitted by the second slave node through the first CAN channel are detected in the active network, so that the first slave node receives the heartbeat packet and the data of the second slave node through the second CAN channel.

To achieve the foregoing objectives, an embodiment in a seventh aspect of the present disclosure provides a second slave node, including: a third determining module, configured to: learn, if it is determined that no heartbeat packet transmitted by the relevant first slave node is received from the active network through a first CAN channel of the second slave node within a preset heartbeat period, that the first CAN channel of the first slave node is faulty, and detect that the second CAN channel of the second slave node is faulty; a fourth transmission module, configured to transmit an information forwarding request including a first slave node identifier to the active master node over the active network, so that the active master node monitors, in the standby network, a heartbeat packet and data transmitted by the first slave node through the second CAN channel; and a third receiving module, configured to receive, through the first CAN channel of the second slave node, the heartbeat packet and the data of the first slave node that are forwarded by the active master node to the active network when the active master node detects in the standby network the heartbeat packet and the data transmitted by the first slave node through the second CAN channel.

To achieve the foregoing objectives, an embodiment in an eighth aspect of the present disclosure provides another active master node, including: a fourth receiving module, configured to receive an information forwarding request in an active network, where the information forwarding request is transmitted by a second slave node through a first CAN channel and includes a first slave node identifier; a third monitoring module, configured to monitor, in the standby network, a heartbeat packet and data transmitted through a second CAN channel by a first slave node corresponding to the first slave node identifier; and a second forwarding module, configured to forward the heartbeat packet and the data of the first slave node to the second slave node over the active network when the heartbeat packet and the data transmitted by the first slave node through the second CAN channel are detected in the standby network, so that the second slave node receives the heartbeat packet and the data of the first slave node through the first CAN channel.

To achieve the foregoing objectives, an embodiment in a ninth aspect of the present disclosure provides a CANopen-based train network data transmission system, including the first slave node according to the embodiment in the fifth aspect of the present disclosure, the active master node according to the embodiment in the sixth aspect, and the second slave node according to the embodiment of the seventh aspect.

To achieve the foregoing objectives, an embodiment in a tenth aspect of the present disclosure provides a CANopen-based train network data transmission system, including the first slave node according to the embodiment in the fifth aspect of the present disclosure, the active master node according to the embodiment in the eighth aspect, and the second slave node according to the embodiment of the seventh aspect.

To achieve the foregoing objectives, an embodiment in an eleventh aspect of the present disclosure provides a computer device, including a memory, a processor, and a computer program stored in the memory and executable by the processor. When executing the computer program, the processor implements the CANopen-based train network data transmission method according to the embodiment in the first aspect of the present disclosure.

To achieve the foregoing objectives, an embodiment in a twelfth aspect of the present disclosure provides another computer device, including a memory, a processor, and a computer program stored in the memory and executable by the processor. When executing the computer program, the processor implements the CANopen-based train network data transmission method according to the embodiment in the second aspect of the present disclosure.

To achieve the foregoing objectives, an embodiment in a thirteenth aspect of the present disclosure provides still another computer device, including a memory, a processor, and a computer program stored in the memory and executable by the processor. When executing the computer program, the processor implements the CANopen-based train network data transmission method according to the embodiment in the third aspect of the present disclosure.

To achieve the foregoing objectives, an embodiment in a fourteenth aspect of the present disclosure provides yet another computer device, including a memory, a processor, and a computer program stored in the memory and executable by the processor. When executing the computer program, the processor implements the CANopen-based train network data transmission method according to the embodiment in the fourth aspect of the present disclosure.

To achieve the foregoing objectives, an embodiment in a fifteenth aspect of the present disclosure provides a storage medium configured to store an application. The application is configured to execute the CANopen-based train network data transmission method according to the embodiment in the first aspect of the present disclosure.

To achieve the foregoing objectives, an embodiment in a sixteenth aspect of the present disclosure provides another storage medium configured to store an application. The application is configured to execute the CANopen-based train network data transmission method according to the embodiment in the second aspect of the present disclosure.

To achieve the foregoing objectives, an embodiment in a seventeenth aspect of the present disclosure provides still another storage medium configured to store an application. The application is configured to execute the CANopen-based train network data transmission method according to the embodiment in the third aspect of the present disclosure.

To achieve the foregoing objectives, an embodiment in an eighteenth aspect of the present disclosure provides yet another storage medium configured to store an application. The application is configured to execute the CANopen-based train network data transmission method according to the embodiment in the fourth aspect of the present disclosure.

The technical solutions provided in the embodiments of the present disclosure may include the following beneficial effects:

The problem that slave nodes cannot normally communicate with each other when CAN channel faults of the slave nodes are in different networks is avoided. A forwarding request is transmitted to the active master node, and the heartbeat packet and the data are forwarded through the active master node, thereby ensuring normal communication between the slave nodes, ensuring sound operation of an entire train, and improving redundancy effects of a train network.

Other aspects and advantages of the present disclosure will be given in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible in the description made with reference to the following accompanying drawings, where:

FIG. 2 is a schematic diagram of data transmission risks of a train network structure;

FIG. 3 is a flowchart of a CANopen-based train network data transmission method according to a first embodiment of the present disclosure;

FIG. 4 is a schematic diagram of overcoming data transmission risks with a train network structure according to the present disclosure;

FIG. 5 is a flowchart of a CANopen-based train network data transmission method according to a second embodiment of the present disclosure;

FIG. 9(b) is a schematic diagram of data exchange between nodes according to another embodiment of the present disclosure;

FIG. 10 is a flowchart of a CANopen-based train network data transmission method according to a fifth embodiment of the present disclosure;

DETAILED DESCRIPTION

The following describes embodiments of the present disclosure in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

A CANopen-based train network data transmission method, system and apparatus according to embodiments of the present disclosure are described below with reference to accompanying drawings.

Specifically, it can be seen from a redundancy network design manner in the prior art that, few train applications currently use a CAN bus as a communications network, and to be specific, a network architecture built with a CAN bus is relatively simple, and even no network redundancy design is properly taken into consideration for a train to which a CAN bus has been applied so far. Even if such consideration is taken, many train manufacturers have limited technical conditions and expect software logic processing of network nodes to be simple, so that a network can be constructed quickly. Therefore, a relatively sound strategy currently available is to simultaneously transmit data in an active network and a standby network, but the data is received over only one of the networks. No matter which node on the active network has broken down, all nodes related to the down node switch to the standby network to receive and process the data of the down node and data of other associated nodes.

Figure 1:
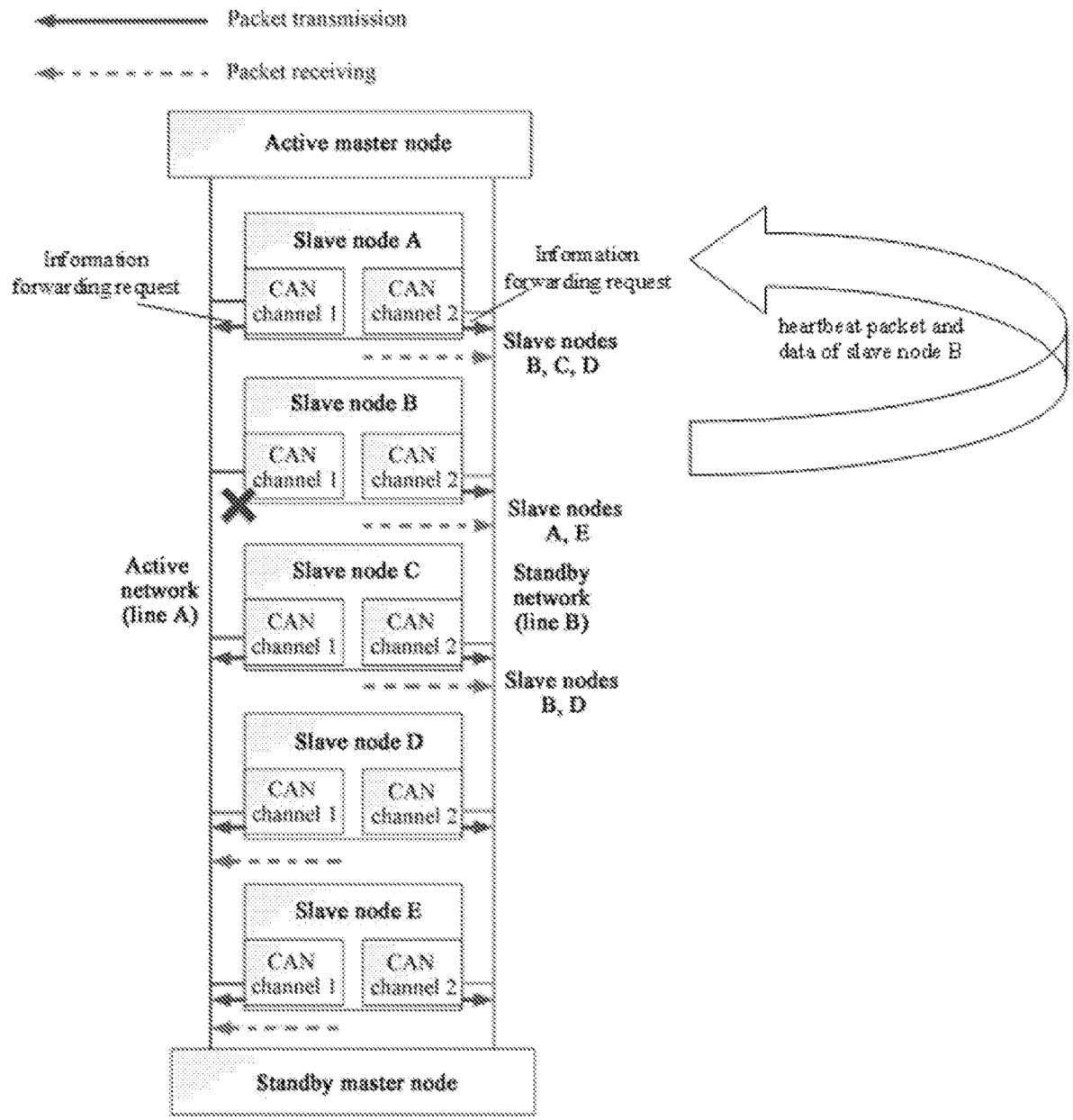
FIG. 1 is a schematic structural diagram of a train network.

For example, as shown in FIG. 1, a slave node A receives data of slave nodes B, C, and D, the slave node B receives data of A and E, the slave node C receives data of B and D, the slave nodes A and C need to receive data of the slave node B, but neither slave node D or E receives data of the slave node B. When a first CAN channel of the slave node B is faulty, the slave node A and the slave node C switch to the standby network to receive data, thereby ensuring normal receipt of the data of the node B.

However, there is a risk in such a processing manner. As shown in FIG. 2, the slave node B needs to receive the data of the slave node C, and the slave node C also needs to receive the data of the slave node B. If the first CAN channel of the slave node B is faulty and a second CAN channel of the slave node C is faulty, the slave node B or the slave node C is actually in a physical isolation state. Neither of the slave nodes can receive the data of the opposite party, thereby affecting operation of the entire train.

To resolve the technical problems in the prior art that data of some nodes cannot be normally received when different channels of a plurality of nodes are faulty, a train network data transmission method provided in the present disclosure provides a data transmission design solution for redundancy networks of trains on the basis of an existing redundancy design structure for train networks. This solution can effectively avoid the phenomenon that nodes cannot normally communicate with each other when active network channels of some nodes are faulty and standby network channels of some other nodes are faulty, and also improve actual effects of redundancy design. This properly avoids disruption of operation of the entire train when a network fault occurs to the train, and can guarantee normal communication between nodes on the network in some abnormal circumstances.

It should be emphasized that the train network data transmission method in the present disclosure is performed based on a CANopen protocol. The CANopen protocol requires that one node in the network should act as a master node to manage initialization, startup, supervision, resetting shutdown or other operations on other slave nodes.

To clarify the CANopen-based train network data transmission method in the present disclosure, the following describes, with reference to specific embodiments, the method applied on a first slave node side. The first slave node may be any slave node that has a communication fault. The method is described as follows:

FIG. 3 is a flowchart of a CANopen-based train network data transmission method according to a first embodiment of the present disclosure. As shown in FIG. 3, the method includes the following steps.

S101. When a first CAN channel of a first slave node is detected as faulty, switch to a second CAN channel of the first slave node to receive, over a standby network, a heartbeat packet and data transmitted by another relevant node.

Understandably, still referring to FIG. 1, in the CANopen-based train network architecture in an embodiment of the present disclosure, two master nodes are set for the network, of which one is an active master node and the other is a standby master node. Only when the active master node is faulty, the standby master node takes over functions of the previously active master node. In addition, all nodes on the network are each connected by CAN lines including line A and line B. The line A is defined as an active network, and the line B is defined as a standby network. During operation, all nodes transmit information (including their respective heartbeat packet) to the line A and the line B simultaneously. However, by default, the information is received only on the line A, but the nodes must support receiving the information simultaneously on the line A and the line B.

In the present disclosure, both the active master node and the standby master node are defined as gateways. Therefore, by default, for data to be transmitted to another network, the gateways only receive the data from an active network, and then the data is transferred to relevant networks (including active networks and standby networks of other networks) according to a gateway forwarding protocol.

In an embodiment of the present disclosure, when the first CAN channel of the first slave node is detected as faulty, for example, when no heartbeat packet transmitted by the first slave node is detected on the first CAN channel in a preset period, it indicates that the first slave node cannot receive, on the first CAN channel, the heartbeat packet transmitted by other nodes. In this case, to ensure normal communication between the first slave node and other nodes, the active master node switches to the second CAN channel of the first slave node to receive, over the standby network, the heartbeat packets and data transmitted by other relevant nodes.

The other relevant slave nodes are other slave nodes with which the first slave node needs to communicate, that is, source slave nodes from which the first slave node needs to receive data.

S102. If it is determined that no heartbeat packet transmitted by a relevant second slave node is received from the standby network within a preset heartbeat period, it is learned that a second CAN channel of the second slave node is faulty, and an information forwarding request including a second slave node identifier is transmitted to the active master node over the standby network, so that the active master node monitors, in an active network, a heartbeat packet and data transmitted by the second slave node through the first CAN channel.

The preset heartbeat period is calibrated according to a large number of experiments. Generally, in the preset period, for example, within five heartbeat periods, the heartbeat packet and the data transmitted by the relevant slave node can be received over a corresponding network.

In addition, the second slave node identifier may include a Node-ID or location information of the second slave node or other information that can uniquely identify the second slave node.

Specifically, if it is determined that no heartbeat packet transmitted by the relevant second slave node is received from the standby network within the preset heartbeat period, it is learned that the second CAN channel of the second slave node is faulty. Therefore, to receive the data of the second slave node, the information forwarding request including the second slave node identifier is transmitted to the active master node over the standby network, so that the active master node monitors, in the active network, the heartbeat packet and the data transmitted by the second slave node through the first CAN channel.

S103. Receive, through the second CAN channel of the first slave node, the heartbeat packet and the data of the second slave node that are forwarded by the active master node to the standby network, when the active master node detects, in the active network, the heartbeat packet and the data transmitted by the second slave node through the first CAN channel.

Specifically, when the active master node detects, in the active network, the heartbeat packet and the data transmitted by the second slave node through the first CAN channel, it indicates that the first CAN channel of the second slave node communicates normally. Therefore, the heartbeat packet and the data of the second slave node that are forwarded by the active master node to the standby network are received through the second CAN channel of the first slave node.

To be specific, in the embodiment of the present disclosure, the heartbeat packet and the data transmitted by the second slave node are received according to a fault state of the CAN channel of the second slave node from which the first slave node needs to receive data. Even if the faulty CAN channel of the second slave node and the faulty CAN channel of the first slave node are not in a same network, the heartbeat packet and the data transmitted by the second slave node can still be normally received by the first slave node through the forwarding by the active master node.

To better clarify a control flow of the CANopen-based train network data transmission method in the present disclosure, the following describes the method with reference to a specific application scenario. In the following example, a first slave node is a slave node A, and a second slave node is a slave node B.

As shown in FIG. 4, when a first CAN channel of the slave node A is faulty, a heartbeat packet or the like transmitted by the slave node A cannot be detected in an active network, and a second CAN channel is switched to, to monitor a heartbeat packet and data transmitted by the slave node B that need to be monitored. However, a second CAN channel of the slave node B is faulty, and the first CAN channel of the slave node A is faulty. Therefore, it cannot be determined whether the slave node A can receive the heartbeat packet and the data from the slave node B over the first CAN channel.

Therefore, an active master node is requested to monitor, over the first CAN channel, the heartbeat packet and the data transmitted by the slave node B. When the active master node detects, in the active network, the heartbeat packet and the data transmitted by the slave node B through the first CAN channel, the heartbeat packet and the data of the slave node B that are forwarded by the active master node to the standby network are received through the second CAN channel of the slave node A. In this way, the slave node A and the slave node B can still normally perform data communication even if the faulty network of the slave node A is different from that of the slave node B.

Thus, in the CANopen-based train network data transmission method according to this embodiment of the present disclosure, when the first CAN channel of the first slave node is faulty, the active master node switches to the second CAN channel of the first slave node to receive, over the standby network, the heartbeat packet and the data transmitted by other relevant nodes. If it is determined that no heartbeat packet transmitted by the relevant second slave node is received from the standby network within the preset heartbeat period, it indicates that the second CAN channel of the second slave node is faulty. In addition, the information forwarding request including the second slave node identifier is transmitted to the active master node over the standby network, so that the active master node monitors, in the active network, the heartbeat packet and the data transmitted by the second slave node through the first CAN channel. When the active master node monitors, in the active network, the heartbeat packet and the data transmitted by the second slave node through the first CAN channel, the heartbeat packet and the data of the second slave node that are forwarded by the active master node to the standby network are received through the second CAN channel of the first slave node. This avoids the problem that slave nodes cannot normally communicate with each other when CAN channel faults of the slave nodes are in different networks. By transmitting a forwarding request to the active master node, normal communication is ensured between the slave nodes, sound operation of an entire train is ensured, and redundancy effects of a train network are improved.

Based on the foregoing embodiment, it should be understood that the two CAN channels of the second slave node may both be faulty in actual application, and consequently, communication between the first slave node and the second slave node cannot be implemented. In this case, it is necessary to record the fault on the first slave node in time to facilitate reporting of the fault and prompt the relevant personnel to handle the fault.

FIG. 5 is a flowchart of a CANopen-based train network data transmission method according to a second embodiment of the present disclosure. As shown in FIG. 5, after step S102, the method further includes the following steps.

S201. Receive, through the second CAN channel of the first slave node, a node fault message including the second slave node identifier and transmitted by the active master node to the standby network, when no heartbeat packet or data transmitted by the second slave node through the first CAN channel is detected by the active master node in the active network.

S202. Record the node fault message of the second slave node.

Specifically, when no heartbeat packet or data transmitted by the second slave node through the first CAN channel is detected by the active master node in the active network, it is learned that the first CAN channel of the second slave node is faulty. In this case, both the first CAN channel and the second CAN channel of the second slave node have a communication fault, and cannot perform normal communication with the first slave node. Therefore, a node fault message including the second slave node identifier and transmitted by the active master node to the standby network is received through the second CAN channel of the first slave node, and the first slave node records the node fault message of the second slave node.

In other words, in the CANopen-based train network data transmission method provided in this embodiment of the present disclosure, the information transmitted by the active master node and received by the first slave node is different, depending on different fault states of the second slave node, as exemplified below.

Figure 6A:
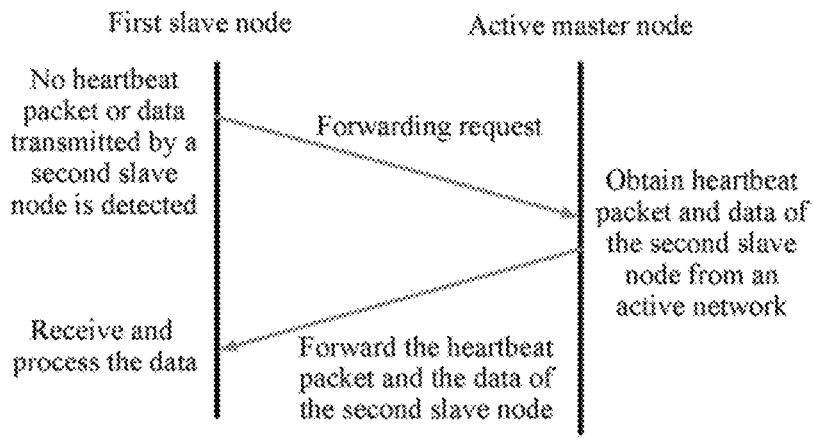
FIG. 6(a) is a schematic diagram of data exchange according to an embodiment of the present disclosure.

As shown in FIG. 6(a), in the CANopen-based train network data transmission method provided this embodiment of the present disclosure, if the first slave node detects no heartbeat packet or data transmitted by the second slave node, it indicates that the faulty CAN channel of the second slave node and the faulty CAN channel of the first slave node may be in different networks. In this example, the first CAN channel of the first slave node is faulty.

Therefore, the first slave node transmits the information forwarding request including the second slave node identifier to the active master node, so that the active master node monitors, in the active network, the heartbeat packet and the data transmitted by the second slave node through the first CAN channel. The heartbeat packet and the data of the second slave node that are forwarded by the active master node to the standby network are received through the second CAN channel of the first slave node, when the active master node detects, in a corresponding network, the heartbeat packet and the data transmitted by the second slave node through the first CAN channel.

Figure 6B:
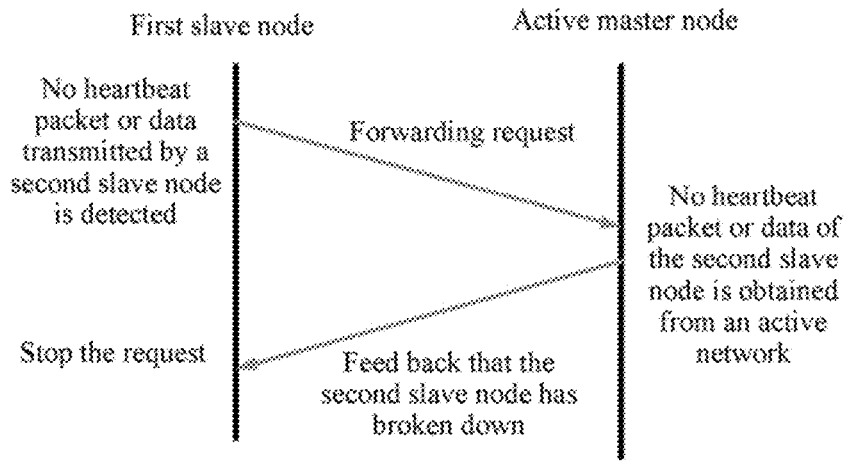
FIG. 6(b) is a schematic diagram of data exchange according to another embodiment of the present disclosure.

As shown in FIG. 6(b), a node fault message including the second slave node identifier and transmitted by the active master node to the standby network is received through the second CAN channel of the first slave node, when no heartbeat packet or data transmitted by the second slave node through the first CAN channel is detected by the active master node in the active network. The first slave node records the node fault message of the second slave node, and stops requesting the heartbeat packet and the data of the second slave node.

Thus, in the CANopen-based train network data transmission method provided in this embodiment of the present disclosure, a node fault message that includes the second slave node identifier is transmitted to the first slave node when the second slave node is faulty, and the first slave node records the node fault message of the second slave node. This improves stability and reliability of an entire train system, and facilitates a relevant operator to fix the fault in time according to the information recorded by the slave node.

To clarify the CANopen-based train network data transmission method provided in this embodiment of the present disclosure, the following describes the method from a perspective of an active master node side, where the active master node focuses on control on the first slave node side.

Figure 7:
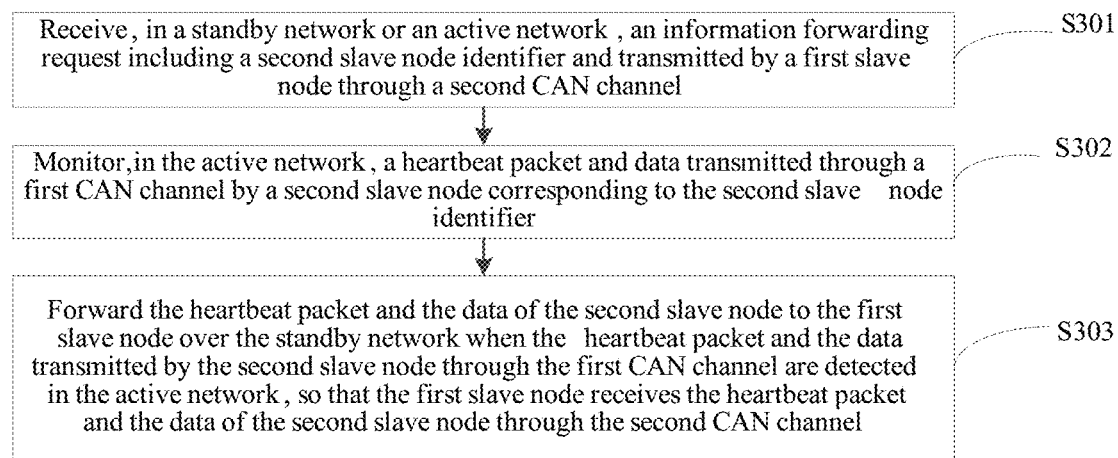
FIG. 7 is a flowchart of a CANopen-based train network data transmission method according to a third embodiment of the present disclosure.

FIG. 7 is a flowchart of a CANopen-based train network data transmission method according to a third embodiment of the present disclosure. As shown in FIG. 7, the method includes the following steps.

S301. Receive, in a standby network or an active network, an information forwarding request including a second slave node identifier and transmitted by a first slave node through a second CAN channel.

Understandably, by default, an active master node receives, in the active network, the heartbeat packet and the data transmitted by the first slave node. If the first CAN channel of the slave node is faulty, the active master node switches to the standby network to receive the heartbeat packet and the data transmitted by the first slave node. When the fault of the first slave node and the fault of the second slave node in communication with the first slave node are in different networks, for example, when the second CAN channel of the second slave node is faulty, the first slave node transmits an information forwarding request including a second slave node identifier to the active master node to communicate with the second slave node.

Specifically, if the active master node receives, in the standby network, the information forwarding request including the second slave node identifier and transmitted by the first slave node through the second CAN channel, it indicates that the first slave node cannot communicate with the second slave node in the standby network.

S302. Monitor, in the active network, a heartbeat packet and data transmitted through a first CAN channel by the second slave node corresponding to the second slave node identifier.

In a practical application, factors for the failure of communication between the first slave node and the second slave node in the standby network may be: the second CAN channel of the second slave node is faulty, and the first CAN channel of the first slave node is faulty, so that communication between the first slave node and the second slave node cannot be implemented; or both the first CAN channel and the second CAN channel of the second slave node are faulty, so that communication between the first slave node and the second slave node cannot be implemented.

Therefore, to determine specific status of the second slave node, the heartbeat packet and the data that are transmitted through the first CAN channel by the second slave node corresponding to the second slave node identifier are monitored in the active network.

S303. Forward the heartbeat packet and the data of the second slave node to the first slave node over the standby network when the heartbeat packet and the data transmitted by the second slave node through the first CAN channel are detected in the active network, so that the first slave node receives the heartbeat packet and the data of the second slave node through the second CAN channel.

Specifically, when the heartbeat packet and the data transmitted by the second slave node through the first CAN channel are detected in the active network, it indicates that the second CAN channel of the second slave node is faulty, and the first CAN channel is normal. The heartbeat packet and the data of the second slave node are forwarded to the first slave node over the standby network, so that the first slave node receives the heartbeat packet and the data of the second slave node through the second CAN channel.

In an embodiment of the present disclosure, if no heartbeat packet or data transmitted by the second slave node through the first CAN channel is detected in the active network, a node fault message including the second slave node identifier is transmitted to the first slave node over the standby network, and the node fault message of the second slave node is transmitted to an operation monitoring node and displayed as a prompt of fixing a current fault. In this way, both the first slave node and the operation monitoring node obtain the fault message of the second slave node, so that the first slave node may stop the corresponding request, and the relevant operator is prompted in time, thereby improving the stability of the entire train network.

Certainly, in some application scenarios, the failure of the communication between the first slave node and the second slave node may be caused by the fault of the active node. In this case, when the active master node is detected as faulty, the standby master node takes over to exchange data with other slave nodes or other communications networks. Because the standby master node and the active master node are based on similar working principles, the details are omitted herein.

Thus, in the CANopen-based train network data transmission method provided in this embodiment of the present disclosure, the information forwarding request including the second slave node identifier and transmitted by the first slave node through the second CAN channel is received in the standby network or the active network, and the heartbeat packet and the data transmitted through the first CAN channel by the second slave node corresponding to the second slave node identifier is monitored in the active network. Therefore, the heartbeat packet and the data of the second slave node are forwarded to the first slave node over the standby network when the heartbeat packet and the data transmitted by the second slave node through the first CAN channel are detected in the active network. In this way, the first slave node receives the heartbeat packet and the data of the second slave node through the second CAN channel. This avoids the problem that slave nodes cannot normally communicate with each other when CAN channel faults of the slave nodes are in different networks. By means of the forwarding by the active master node, normal communication is ensured between the slave nodes, sound operation of an entire train is ensured, and redundancy effects of a train network are improved.

Based on the foregoing embodiment, it should be emphasized that the CANopen-based train network data transmission method in the present disclosure is applicable to slave nodes in a same communications network and slave nodes in different communications networks.

Figure 8:
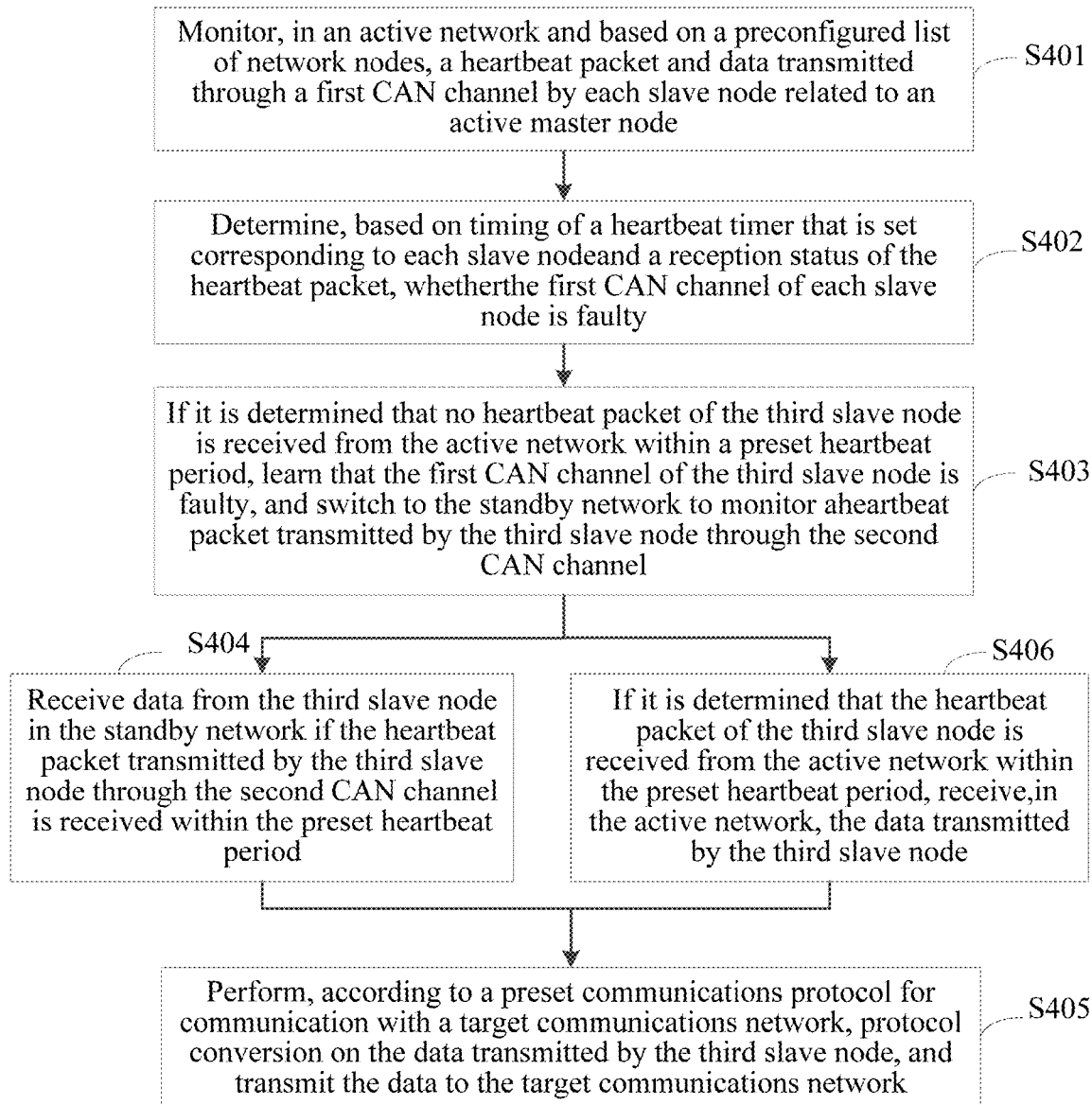
FIG. 8 is a flowchart of a CANopen-based train network data transmission method according to a fourth embodiment of the present disclosure.

FIG. 8 is a flowchart of a CANopen-based train network data transmission method according to a fourth embodiment of the present disclosure. As shown in FIG. 8, the method includes the following steps.

S401. Monitor, in an active network and based on a preconfigured list of network nodes, a heartbeat packet and data transmitted through a first CAN channel by each slave node related to an active master node.

In an actual data transmission process, the active master node creates a list of all the slave nodes in a network according to a topology view (where the list is configurable), and each slave node creates a list of related network nodes according to the topology view (where the lists all need to include the active master node and are configurable). By default, each slave node monitors transmission of heartbeat packets of related nodes in the active network according to the lists of network nodes, and obtains desired data from the active network.

Specifically, after getting in operation, the active master node performs a heartbeat packet monitoring mechanism. The active master node may create the list of all network nodes (configurable) according to the network topology view. To be specific, an object index in a CANopen object dictionary is customized to identify each of the nodes by using a unique identifier of the node, and node identifiers of all the slave nodes (such as slave node IDs) are included in object storage space. The active master node sets a heartbeat timer for each of the slave nodes. After the active master node gets in operation, each of the heartbeat timers counts down. The active master node parses a received heartbeat packet to obtain a corresponding slave node identifier, and then matches the slave node identifier with a node list in its own object dictionary. Once a slave node is matched, the active master node resets a heartbeat timer corresponding to the matched slave node to restart timing. According to a requirement of this feature, all the slave nodes including the active master node simultaneously and cyclically transmit, in the active network and the standby network, the heartbeat packets by using their respective node IDs and by using a specific period.

S402. Determine, based on timing of a heartbeat timer that is set corresponding to each slave node and a reception status of the heartbeat packet, whether the first CAN channel of each slave node is faulty.

For example, if a first CAN channel of a slave node is in proper communication, the active master node can normally receive a heartbeat packet from the slave node within a specified time. Otherwise, the first CAN channel of the slave node is in faulty communication.

Certainly, in some circumstances, the active master node may fail in normally receiving the heartbeat packet from the slave node due to some other reasons. For example, network signals are subjected to abrupt interference. Therefore, in order to avoid misjudgment and accurately determine whether the first CAN channels of the slave nodes are faulty, the timing situations of the heartbeat timers that are set corresponding to the slave nodes and the receiving situations of the heartbeat packets are taken into overall consideration, to determine whether the first CAN channels of the slave nodes are faulty.

For example, when no heartbeat packet of a slave node is detected in three heartbeat periods, the active master node first resets the slave node by using a reset instruction controlled by the network, and then keeps monitoring in two heartbeat periods. If the heartbeat packet of the slave node is received in the two heartbeat periods, the active master node keeps processing on the node in the active network. Otherwise, the first CAN channel of the slave node may be faulty.

Further, the timing situation of the heartbeat timer in the foregoing example is merely exemplary. Depending on different application requirements, whether the first CAN channels of the slave nodes are faulty may also be determined according to a combination of other heartbeat periods. For example, when no heartbeat packet of a slave node is detected in five heartbeat periods, it is directly determined that a first CAN channel of the slave node is faulty.

S403. If it is determined that no heartbeat packet of a third slave node is received from the active network within a preset heartbeat period, determine that the first CAN channel of the third slave node is faulty, and switch to the standby network to monitor the heartbeat packet transmitted by the third slave node through the second CAN channel.

The third slave node is any node that exchanges information with another communications network.

Specifically, if the heartbeat packet of the third slave node is not received in the preset heartbeat period, it indicates that the active master node cannot receive the heartbeat packet transmitted by the third slave node due to the fault of the first CAN channel. Therefore, to ensure that the active master node normally receives the data of the third slave node to maintain normal operation of the entire train, the active master node switches to the standby network to monitor the heartbeat packet transmitted by the third slave node through the second CAN channel.

S404. Receive data transmitted from the third slave node in the standby network if the heartbeat packet transmitted by the third slave node through the second CAN channel is received within the preset heartbeat period.

Specifically, if the heartbeat packet transmitted by the third slave node through the second CAN channel is received within the preset heartbeat period, it indicates that the second CAN channel functions normally. Therefore, the data transmitted by the third slave node is received over the standby network.

S405. Perform, based on a preset communications protocol with a target communications network, protocol conversion on the data transmitted by the third slave node, and transmit the data to the target communications network.

Specifically, to ensure another network to normally receive the data transmitted by the third slave node, protocol conversion is performed, based on the preset communications protocol with the target communications network, on the data transmitted by the third slave node, and the data is transmitted to the target communications network.

S406. If it is determined that the heartbeat packet of the third slave node is received from the active network within the preset heartbeat period, receive, in the active network, the data transmitted by the third slave node.

Specifically, if it is determined that the heartbeat packet of the third slave node is received from the active network within the preset heartbeat period, it indicates that the first CAN channel of the third slave node is in normal communication. Therefore, the data transmitted by the third slave node is received in the active network. In addition, to ensure another network to normally receive the data transmitted by the third slave node, step S405 is performed. Protocol conversion is performed, based on the preset communications protocol with the target communications network, on the data transmitted by the third slave node, and the data is transmitted to the target communications network.

To clarify the foregoing implementation process, examples are given below.

Figure 9A:
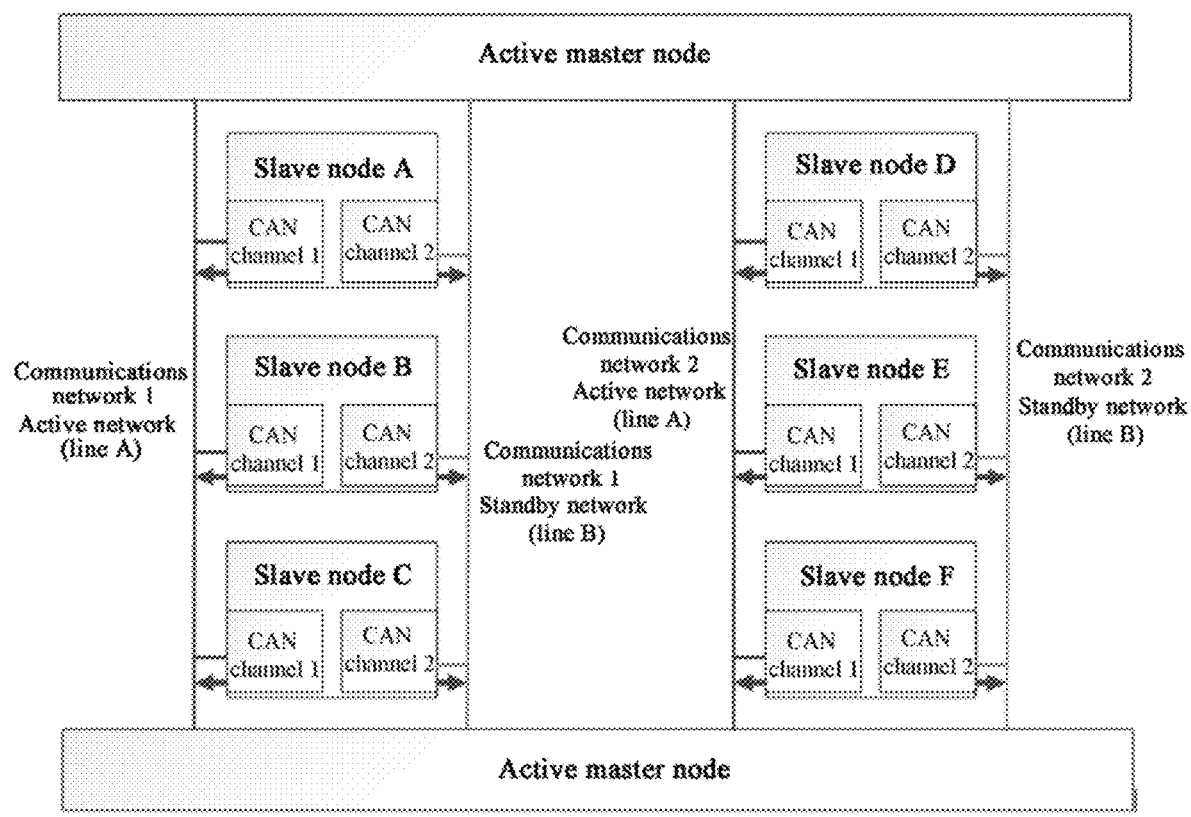
FIG. 9(a) is a schematic diagram of data exchange between nodes according to an embodiment of the present disclosure.

As shown in FIG. 9(a), when slave nodes in a communications network 1 and a communications network 2 in an entire train network perform data exchange, the active master node acts as an intermediate data forwarding bridge to exchange information between the two communications networks. For example, if a slave node D in the communications network 2 needs to receive heartbeat packets and data from a slave node A and a slave node B in the communications network 1, then after receiving the heartbeat packets and data from the slave node A and the slave node B, the active master node performs, based on a preset communications protocol with a target communications network protocol conversion on the heartbeat packets and data of the slave node A and the slave node B, and forwards the heartbeat packets and data to the slave node D to a network (an active network or a standby network) the communications network 2.

In some application scenarios, as shown in FIG. 9(b), when a first CAN channel of the slave node A in the communications network 1 is faulty and a second CAN channel of the slave node B is faulty, the active master node receives, in the active network, the heartbeat packet and the data transmitted by the slave Node B, and receives, in the standby network, the heartbeat packet and the data transmitted by the slave node A. The active master node performs, based on the preset communications protocol with the target communications network protocol conversion on the heartbeat packets and data of the slave node A and the slave node B, and forwards them to the slave node D over the active network of the communications network 2.

Thus, the CANopen-based train network data transmission method provided in this embodiment of the present disclosure may be applicable to not only communication between slave nodes in one communications network, but also communication between slave nodes of different communications networks, thereby ensuring normal communication of slave nodes between different communications networks, further ensuring sound operation of the entire train, and improving redundancy effects of the train network.

To clarify the CANopen-based train network data transmission method provided in this embodiment of the present disclosure, the following describes the method from a perspective of a second slave node side. As can be seen from the above description, the second slave node is any slave node that communicates with the first slave node.

FIG. 10 is a flowchart of a CANopen-based train network data transmission method according to a fifth embodiment of the present disclosure. As shown in FIG. 10, the method includes the following steps.

S501. If it is determined that no heartbeat packet transmitted by the relevant first slave node is received from the active network through a first CAN channel of the second slave node within a preset heartbeat period, it is learned that the first CAN channel of the first slave node is faulty, and the second CAN channel of the second slave node is detected to be faulty.

Specifically, if it is determined that the heartbeat packet transmitted by the relevant first slave node is not received from the active network through the first CAN channel of the second slave node within the preset heartbeat period, for example, if the heartbeat packet transmitted by the relevant first slave node is not received from the active network through the first CAN channel of the second slave node in five consecutive heartbeat periods, it indicates that the first slave node probably cannot transmit relevant data through the first CAN channel, and it is learned that the first CAN channel of the first slave node is faulty.

It should be understood that, in this case, the first slave node transmits data through the second CAN channel, and in this embodiment, the second CAN channel of the second slave node is detected as faulty.

S502. Transmit an information forwarding request including a first slave node identifier to the active master node over the active network, so that the active master node monitors, in the standby network, a heartbeat packet and data transmitted by the first slave node through the second CAN channel.

It can be understood that, in this case, the second slave node can communicate only on the active network, and the first CAN channel of the first slave node is faulty and cannot transmit relevant data on the active network. Therefore, to normally receive the data transmitted by the second slave node, the second slave node transmits the information forwarding request including the first slave node identifier to the active master node over the active network. In this way, the active master node monitors, in the standby network, the heartbeat packet and the data transmitted by the first slave node through the second CAN channel.

S503. Receive, through the first CAN channel of the second slave node, the heartbeat packet and the data of the first slave node that are forwarded by the active master node to the active network, when the active master node detects, in the standby network, the heartbeat packet and the data transmitted by the first slave node through the second CAN channel.

Specifically, in an embodiment of the present disclosure, when the active master node detects, in the standby network, the heartbeat packet and the data transmitted by the first slave node through the second CAN channel, it indicates that the second CAN channel of the first slave node is normal at this time. Therefore, the heartbeat packet and the data of the first slave node that are forwarded by the active master node to the active network, are received through the first CAN channel of the second slave node.

In another embodiment of the present disclosure, two CAN channels of the first slave node may both be faulty. In this case, communication between the second slave node and the first slave node cannot be implemented, and it is necessary to record the fault on the second slave node in time to facilitate reporting of the fault and prompt the relevant personnel to handle the fault.

In this embodiment, a node fault message is received through the first CAN channel of the second slave node when no heartbeat packet or data transmitted by the first slave node through the second CAN channel is detected by the active master node over the standby network, where the node fault message includes the first slave node identifier and is transmitted by the active master node to the active network. The second slave node records the node fault message of the first slave node, and stops requesting the heartbeat packet and the data of the first slave node.

It should be noted that the CANopen-based train network data transmission method described from a perspective of the second slave node side corresponds to the CANopen-based train network data transmission method described from a perspective of the first slave node side, and has omitted corresponding details herein as appropriate.

Accordingly, in the CANopen-based train network data transmission method provided in this embodiment of the present disclosure, the information forwarding request including the second slave node identifier and transmitted by the first slave node through the second CAN channel is received over the standby network or the active network, and the heartbeat packet and the data transmitted through the first CAN channel by the second slave node corresponding to the second slave node identifier is monitored over the active network. Therefore, the heartbeat packet and the data of the second slave node are forwarded to the first slave node over the standby network when the heartbeat packet and the data transmitted by the second slave node through the first CAN channel are detected over the active network. In this way, the first slave node receives the heartbeat packet and the data of the second slave node through the second CAN channel. This avoids the problem that slave nodes cannot normally communicate with each other when CAN channel faults of the slave nodes are in different networks. By transmitting a forwarding request to the active master node, normal communication is ensured between the slave nodes, sound operation of an entire train is ensured, and redundancy effects of a train network are improved.

To clarify the CANopen-based train network data transmission method provided in this embodiment of the present disclosure, the following describes the method from a perspective of an active master node side, where the active master node focuses on control on the second slave node side.

Figure 11:
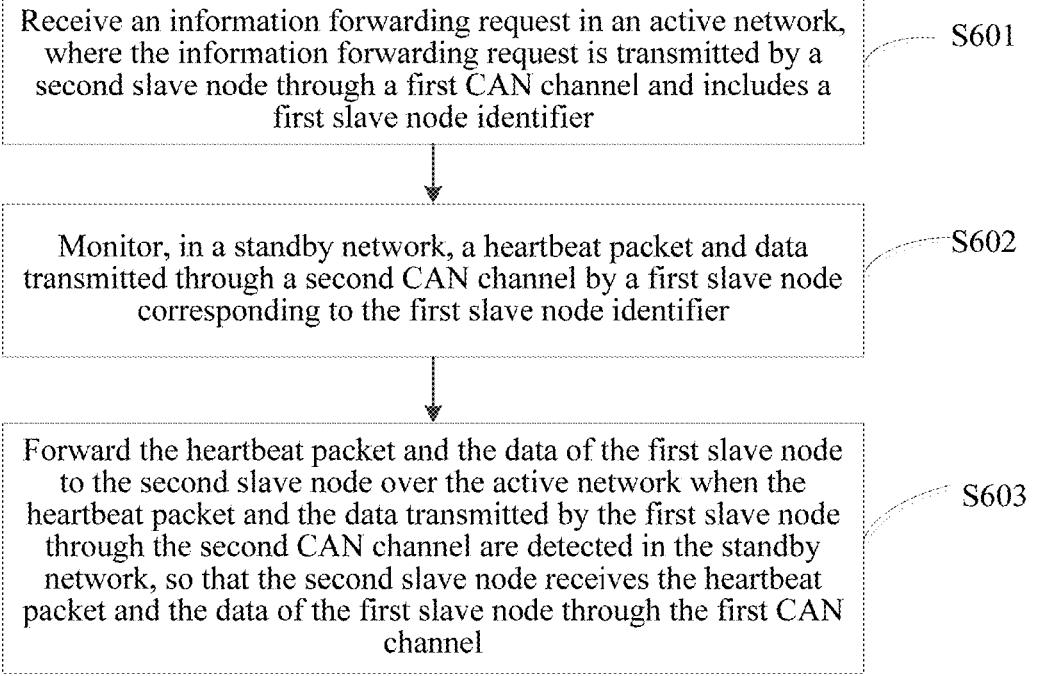
FIG. 11 is a flowchart of a CANopen-based train network data transmission method according to a sixth embodiment of the present disclosure.

FIG. 11 is a flowchart of a CANopen-based train network data transmission method according to a sixth embodiment of the present disclosure. As shown in FIG. 11, the method includes the following steps.

S601. Receive an information forwarding request in an active network, where the information forwarding request is transmitted by a second slave node through a first CAN channel and includes a first slave node identifier.

Understandably, by default, the active master node receives over the active network the heartbeat packet and the data transmitted by the first slave node. If the first CAN channel of the first slave node is faulty, the active master node switches to a standby network to receive the heartbeat packet and the data transmitted by the first slave node. When the fault of the second slave node and the fault of the first slave node in communication with the second slave node are in different networks, for example, when a second CAN channel of the second slave node is faulty, the second slave node transmits an information forwarding request including a first slave node identifier to the active master node to communicate with the first slave node.

Specifically, if the active master node successfully receives, in the active network, the information forwarding request including the first slave node identifier and transmitted by the second slave node through the first CAN channel, it indicates that the second slave node cannot communicate with the first slave node in the active network.

S602. Monitor in the standby network the heartbeat packet and the data transmitted through the second CAN channel by the first slave node corresponding to the first slave node identifier.

In a practical application, the failure of communication between the first slave node and the second slave node in the standby network may be caused by the fault of the first CAN channel of the first slave node (and the fault of the second CAN channel of the second slave node makes the second slave node unable to communicate with the first slave node), or by the fault of both the first CAN channel and the second CAN channel of the first slave node.

Therefore, to determine specific status of the first slave node, the heartbeat packet and the data transmitted through the second CAN channel by the first slave node corresponding to the first slave node identifier are monitored in the standby network.

S603. Forward the heartbeat packet and the data of the first slave node to the second slave node in the active network when the heartbeat packet and the data transmitted by the first slave node through the second CAN channel are detected in the standby network, so that the second slave node receives the heartbeat packet and the data of the first slave node through the first CAN channel.

Specifically, when the heartbeat packet and the data transmitted by the first slave node through the second CAN channel are detected in the standby network, it indicates that the first CAN channel of the first slave node is faulty, and the second CAN channel is normal. The heartbeat packet and the data of the first slave node are forwarded to the second slave node over the active network, so that the second slave node receives the heartbeat packet and the data of the first slave node through the first CAN channel.

In an embodiment of the present disclosure, if no heartbeat packet or data transmitted by the first slave node through the second CAN channel is detected over the standby network, a node fault message including the first slave node identifier is transmitted to the second slave node over the active network, and the node fault message of the first slave node is transmitted to an operation monitoring node and displayed to an operator as a prompt of fixing a current fault. In this way, both the second slave node and the operation monitoring node obtain the fault message of the first slave node, so that the second slave node may stop the corresponding request, and the relevant operator is prompted in time, thereby improving the stability of the entire train network.

It should be noted that the CANopen-based train network data transmission method described from a perspective of controlling the first slave node side corresponds to the CANopen-based train network data transmission method described from a perspective of controlling the second slave node side, and has omitted corresponding details herein as appropriate.

In some application scenarios, however, the failure of the communication between the first slave node and the second slave node may be caused by the fault of the active node. In this case, when the active master node is detected as faulty, the standby master node takes over to exchange data with other slave nodes or other communications networks. Because the standby master node and the active master node are based on similar working principles, details about the standby master node are omitted herein.

Accordingly, in the CANopen-based train network data transmission method provided in this embodiment of the present disclosure, the information forwarding request including the first slave node identifier and transmitted by the second slave node through the first CAN channel is received in the active network, and the heartbeat packet and the data transmitted through the second CAN channel by the first slave node corresponding to the first slave node identifier is monitored in the standby network. Further, the heartbeat packet and the data of the first slave node are forwarded to the second slave node over the active network when the heartbeat packet and the data transmitted by the first slave node through the second CAN channel are detected in the standby network. In this way, the second slave node receives the heartbeat packet and the data of the first slave node through the first CAN channel. This avoids the problem that slave nodes cannot normally communicate with each other when CAN channel faults of the slave nodes are in different networks. By means of the forwarding by the active master node, normal communication is ensured between the slave nodes, sound operation of an entire train is ensured, and redundancy effects of a train network are improved.

Based on the foregoing embodiment, it should be emphasized that the CANopen-based train network data transmission method in the present disclosure is applicable to slave nodes in a same communications network and slave nodes in different communications networks.

It should be noted that the execution method and technical effects of this embodiment correspond to the execution method and technical effects of the CANopen-based train network data transmission method described in the fourth embodiment of the present disclosure with reference to FIG. 8, and are omitted herein.

Figure 12:
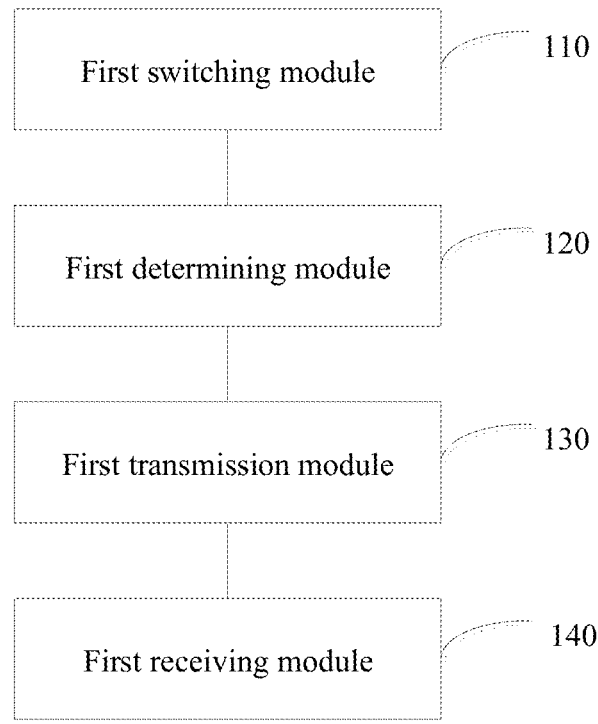
FIG. 12 is a schematic structural diagram of a first slave node according to an embodiment of the present disclosure.

To implement the foregoing embodiments, the present disclosure also provides a first slave node. FIG. 12 is a schematic structural diagram of a first slave node according to an embodiment of the present disclosure. As shown in FIG. 12, the first slave node includes a first switching module 110, a first determining module 120, a first transmission module 130, and a first receiving module 140.

The first switching module 110 is configured to switch, when a first CAN channel of a first slave node is detected as faulty, to a second CAN channel of the first slave node to receive over a standby network a heartbeat packet and data transmitted by another relevant node.

The first determining module 120 is configured to learn, if it is determined that no heartbeat packet transmitted by a relevant second slave node is received from the standby network within a preset heartbeat period, that a second CAN channel of the second slave node is faulty.

The first transmission module 130 is configured to transmit an information forwarding request including a second slave node identifier to the active master node over the standby network, so that the active master node monitors, in an active network, a heartbeat packet and data transmitted by the second slave node through the first CAN channel.

The first receiving module 140 is configured to receive the heartbeat packet and the data of the second slave node through the second CAN channel of the first slave node when the active master node monitors in the active network the heartbeat packet and the data transmitted by the second slave node through the first CAN channel, where the heartbeat packet and the data are forwarded by the active master node to the standby network.

It should be noted that the CANopen-based train network data transmission method described above from a perspective of a first slave node side corresponds to the first slave node described in this embodiment, and is based on similar implementation principles, which are omitted herein.

Accordingly, with the first slave node according to the embodiment of the present disclosure, when the first CAN channel of the first slave node is faulty, the active master node switches to the second CAN channel of the first slave node to receive, over the standby network, the heartbeat packet and the data transmitted by other relevant nodes. If it is determined that no heartbeat packet transmitted by the relevant second slave node is received from the standby network within a preset heartbeat period, it indicates that the second CAN channel of the second slave node is faulty. In this case, an information forwarding request including a second slave node identifier is transmitted to the active master node over the standby network, so that the active master node monitors, in the active network, the heartbeat packet and the data transmitted by the second slave node through the first CAN channel. When the active master node monitors in the active network the heartbeat packet and the data transmitted by the second slave node through the first CAN channel, the heartbeat packet and the data of the second slave node that are forwarded by the active master node to the standby network are received through the second CAN channel of the first slave node. This avoids the problem that slave nodes cannot normally communicate with each other when CAN channel faults of the slave nodes are in different networks. By transmitting a forwarding request to the active master node, normal communication is ensured between the slave nodes, sound operation of an entire train is ensured, and redundancy effects of a train network are improved.

Figure 13:
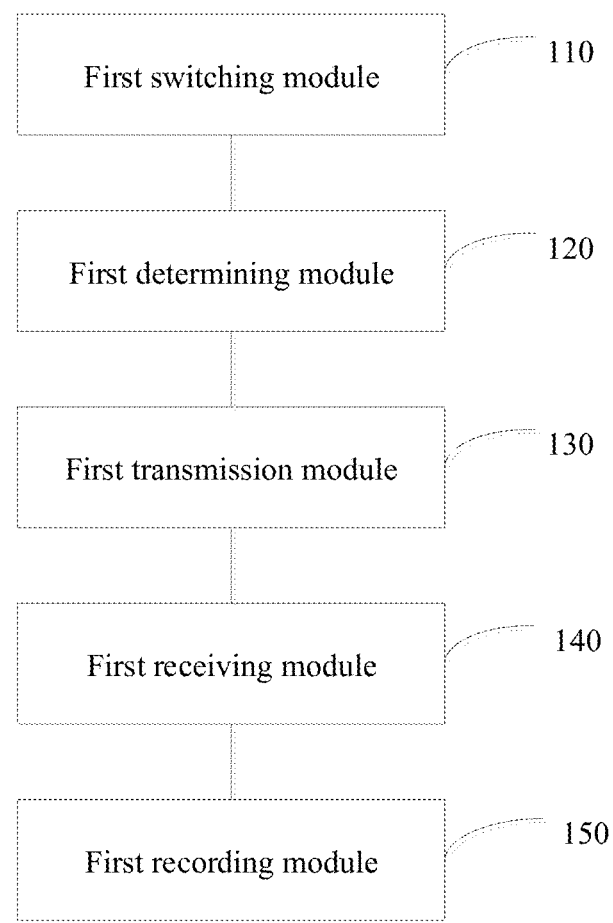
FIG. 13 is a schematic structural diagram of a first slave node according to another embodiment of the present disclosure.

FIG. 13 is a schematic structural diagram of a first slave node according to another embodiment of the present disclosure. As shown in FIG. 13, on the basis of what is shown in FIG. 12, the first slave node further includes a first recording module 150.

The first receiving module 140 is further configured to receive a node fault message through the second CAN channel of the first slave node when no heartbeat packet or data transmitted by the second slave node through the first CAN channel is detected by the active master node in the active network, where the node fault message includes the second slave node identifier and is transmitted by the active master node to the standby network.

The first recording module 150 is configured to record the node fault message of the second slave node.

It should be noted that the CANopen-based train network data transmission method described above from a perspective of a first slave node side corresponds to the first slave node described in this embodiment, and is based on similar implementation principles, which are omitted herein.

Accordingly, when the second slave node is faulty, the first slave node in the embodiment of the present disclosure transmits a node fault message including the second slave node identifier to the first slave node, and the first slave node records the node fault message of the second slave node. This improves stability and reliability of an entire train system, and facilitates a relevant operator to fix the fault in time according to the information recorded by the slave node.

Figure 14:
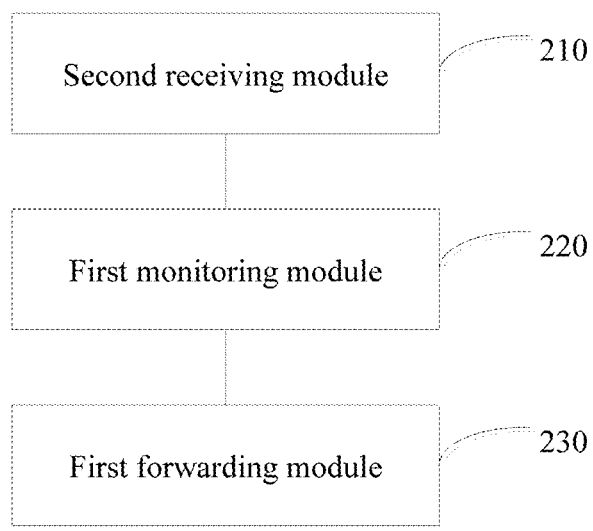
FIG. 14 is a schematic structural diagram of an active master node according to an embodiment of the present disclosure.

To implement the foregoing embodiments, the present disclosure also provides an active master node. FIG. 14 is a schematic structural diagram of an active master node according to an embodiment of the present disclosure. As shown in FIG. 14, the active master node includes a second receiving module 210, a first monitoring module 220, and a first forwarding module 230.

The second receiving module 210 is configured to receive an information forwarding request in a standby network or an active network, where the information forwarding request is transmitted by a first slave node through a second CAN channel and includes a second slave node identifier.

The first monitoring module 220 is configured to monitor, in the active network, a heartbeat packet and data transmitted through a first CAN channel by a second slave node corresponding to the second slave node identifier.

The first forwarding module 230 is configured to forward the heartbeat packet and the data of the second slave node to the first slave node over the standby network when the heartbeat packet and the data transmitted by the second slave node through the first CAN channel are detected over the active network, so that the first slave node receives the heartbeat packet and the data of the second slave node through the second CAN channel.

Figure 15:
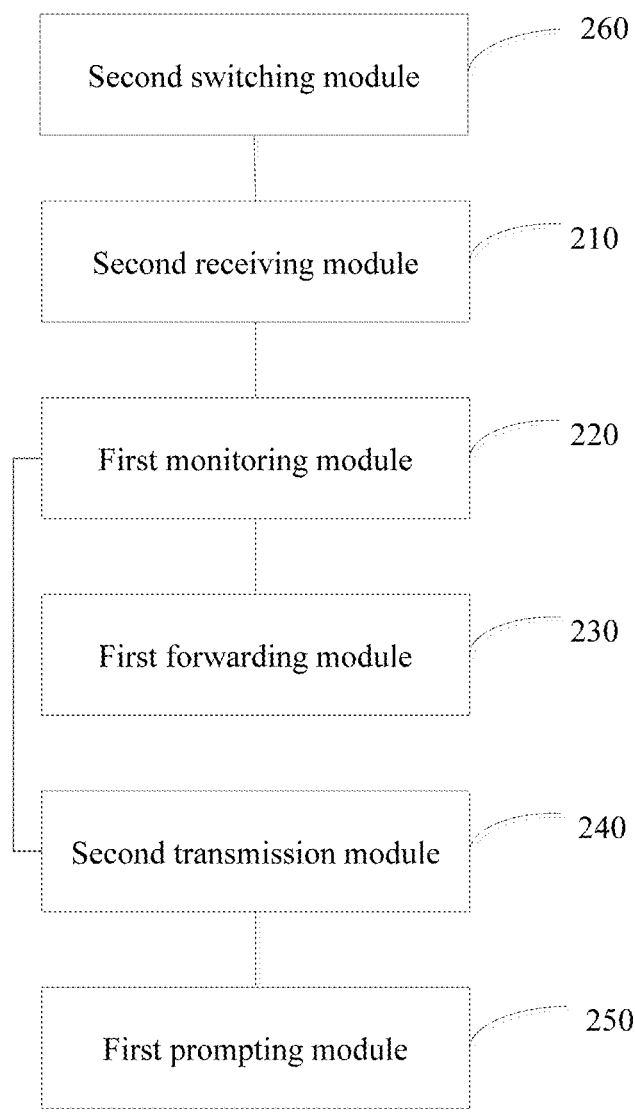
FIG. 15 is a schematic structural diagram of an active master node according to another embodiment of the present disclosure.

FIG. 15 is a schematic structural diagram of an active master node according to another embodiment of the present disclosure. As shown in FIG. 15, on the basis of what is shown in FIG. 14, the active master node further includes: a second transmission module 240, a first prompting module 250, and a second switching module 260.

The second transmission module 240 is configured to transmit, if no heartbeat packet or data transmitted by the second slave node through the first CAN channel is detected in the active network, a node fault message that includes the second slave node identifier to the first slave node over the standby network.

The first prompting module 250 is configured to transmit the node fault message of the second slave node to an operation monitoring node, and display it to an operator as a prompt of a current fault to be fixed.

The second switching module 260 is configured to switch to a standby master node to perform data exchange with another slave node or another communications network after detecting a fault of the active master node.

It should be noted that the CANopen-based train network data transmission method described above from a perspective of an active master node for controlling a first slave node side corresponds to the active master node described in this embodiment of the present disclosure, and is based on similar implementation principles, which are omitted herein.

Accordingly, with the active master node provided in this embodiment of the present disclosure, the information forwarding request including the second slave node identifier and transmitted by the first slave node through the second CAN channel is received in the standby network or the active network, and the heartbeat packet and the data transmitted through the first CAN channel by the second slave node corresponding to the second slave node identifier is monitored in the active network. Therefore, the heartbeat packet and the data of the second slave node are forwarded to the first slave node over the standby network when the heartbeat packet and the data transmitted by the second slave node through the first CAN channel are detected in the active network. In this way, the first slave node receives the heartbeat packet and the data of the second slave node through the second CAN channel. This avoids the problem that slave nodes cannot normally communicate with each other when CAN channel faults of the slave nodes are in different networks. By means of the forwarding by the active master node, normal communication is ensured between the slave nodes, sound operation of an entire train is ensured, and redundancy effects of a train network are improved.

Figure 16:
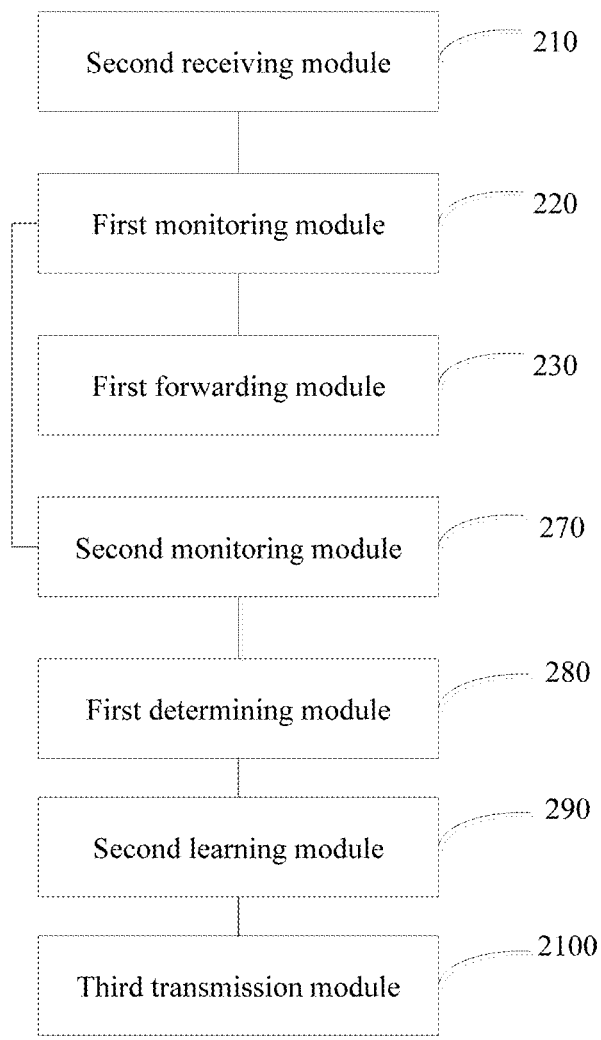
FIG. 16 is a schematic structural diagram of an active master node according to another embodiment of the present disclosure.

FIG. 16 is a schematic structural diagram of an active master node according to still another embodiment of the present disclosure. As shown in FIG. 16, on the basis of what is shown in FIG. 14, the active master node further includes: a second monitoring module 270, a first determining module 280, a second determining module 290, and a third transmission module 2100.

The second monitoring module 270 is configured to monitor, in the active network and based on a preconfigured list of network nodes, a heartbeat packet and data transmitted through a first CAN channel by each slave node related to the active master node.

The first determining module 280 is configured to determine, based on timing of a heartbeat timer that is set corresponding to each slave node and a reception status of the heartbeat packet, whether a first CAN channel of each slave node is faulty.

The second determining module 290 is configured to learn, if it is determined that no heartbeat packet of a third slave node is received from the active network within a preset heartbeat period, that a first CAN channel of the third slave node is faulty;

In an embodiment of the present disclosure, the second monitoring module 270 is further configured to switch to the standby network to monitor a heartbeat packet transmitted by the third slave node through a second CAN channel, where the third slave node is any node that performs information exchange with another communications network.

The second receiving module 210 is further configured to receive data from the third slave node in the standby network if the heartbeat packet transmitted by the third slave node through the second CAN channel is received within the preset heartbeat period.

The third transmission module 2100 is configured to perform, according to a preset communications protocol for communication with a target communications network, protocol conversion on the data transmitted by the third slave node, and transmit the data to the target communications network.

In an embodiment of the present disclosure, if it is determined that the heartbeat packet of the third slave node is received from the active network within the preset heartbeat period, the second receiving module 210 receives, in the active network, the data transmitted by the third slave node, and based on the preset communication protocol for communication with the target communications network, the third transmission module 2100 performs protocol conversion on the data transmitted by the third slave node, and transmits the data to the target communications network.

It should be noted that the CANopen-based train network data transmission method described above from a perspective of an active master node for controlling a first slave node side corresponds to the active master node described in this embodiment of the present disclosure, and is based on similar implementation principles, which are omitted herein.

Accordingly, the active master node provided in this embodiment of the present disclosure is applicable to not only the communication between slave nodes in a same communications network, but also the communication between slave nodes of different communications networks, thereby ensuring normal communication of slave nodes between different communications network, further ensuring sound operation of the entire train, and improving redundancy effects of the train network.

Figure 17:
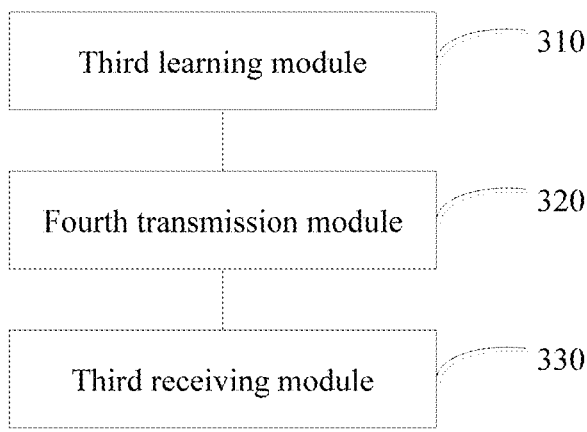
FIG. 17 is a schematic structural diagram of a second slave node according to an embodiment of the present disclosure.

To implement the foregoing embodiments, the present disclosure also provides a second slave node. FIG. 17 is a schematic structural diagram of a second slave node according to an embodiment of the present disclosure. As shown in FIG. 17, the second slave node includes a third determining module 310, a fourth transmission module 320, and a third receiving module 330.

The third determining module 310 is configured to learn, if it is determined that no heartbeat packet transmitted by a relevant first slave node is received from the active network through a first CAN channel of the second slave node within a preset heartbeat period, that the first CAN channel of the first slave node is faulty, and detect that a second CAN channel of the second slave node is faulty.

The fourth transmission module 320 is configured to transmit an information forwarding request including a first slave node identifier to the active master node over the active network, so that the active master node monitors, in a standby network, a heartbeat packet and data transmitted by the first slave node through the second CAN channel.

The third receiving module 330 is configured to receive the heartbeat packet and the data of the first slave node through the first CAN channel of the second slave node when the active master node monitored in the standby network the heartbeat packet and the data transmitted by the first slave node through the second CAN channel, where the heartbeat packet and the data are forwarded by the active master node to the active network.

Figure 18:
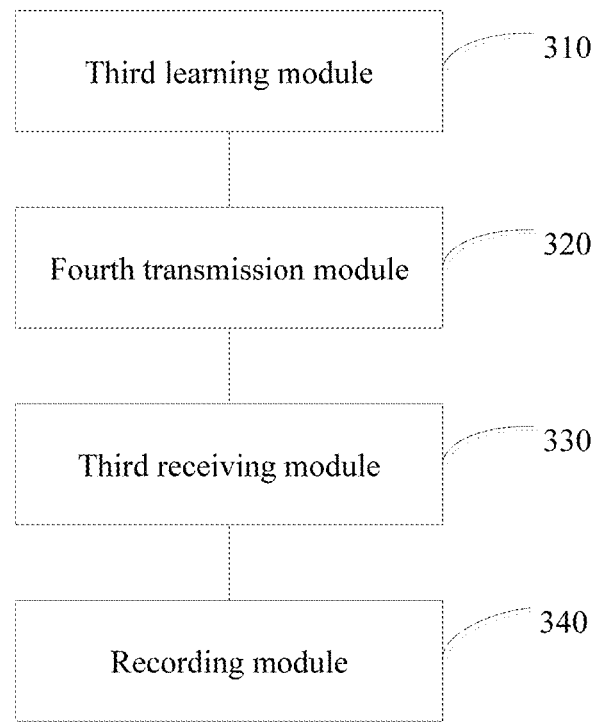
FIG. 18 is a schematic structural diagram of a second slave node according to another embodiment of the present disclosure.

FIG. 18 is a schematic structural diagram of a second slave node according to another embodiment of the present disclosure. As shown in FIG. 18, on the basis of what is shown in FIG. 17, the second slave node further includes a second recording module 340.

The third receiving module 330 is further configured to receive a node fault message through the first CAN channel of the second slave node when no heartbeat packet or data transmitted by the first slave node through the second CAN channel is detected by the active master node in the standby network, where the node fault message includes the first slave node identifier and is transmitted by the active master node to the active network.

The second recording module 340 is configured to record the node fault message of the first slave node.

It should be noted that the CANopen-based train network data transmission method described above from a perspective of a second slave node side is also applicable to the second slave node described in this embodiment of the present disclosure, and is based on similar implementation principles, which are omitted herein.

Accordingly, with the second slave node provided in this embodiment of the present disclosure, the information forwarding request including the second slave node identifier and transmitted by the first slave node through the second CAN channel is received in the standby network or the active network, and the heartbeat packet and the data transmitted through the first CAN channel by the second slave node corresponding to the second slave node identifier is monitored in the active network. Therefore, the heartbeat packet and the data of the second slave node are forwarded to the first slave node over the standby network when the heartbeat packet and the data transmitted by the second slave node through the first CAN channel are detected in the active network. In this way, the first slave node receives the heartbeat packet and the data of the second slave node through the second CAN channel. This avoids the problem that slave nodes cannot normally communicate with each other when CAN channel faults of the slave nodes are in different networks. By transmitting a forwarding request to the active master node, normal communication is ensured between the slave nodes, sound operation of an entire train is ensured, and redundancy effects of a train network are improved.

Figure 19:
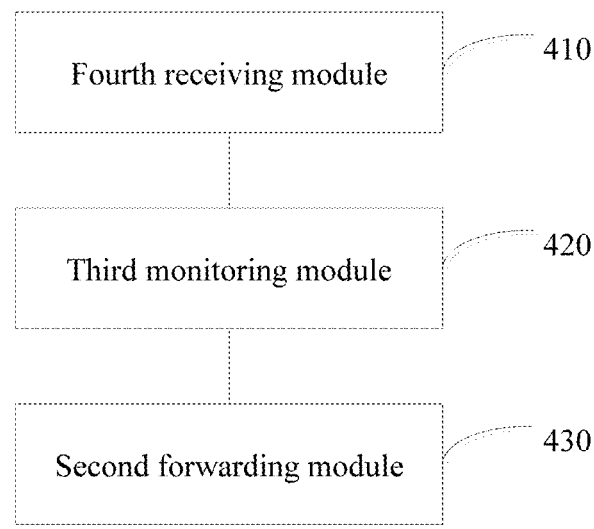
FIG. 19 is a schematic structural diagram of an active master node according to an embodiment of the present disclosure.

To implement the foregoing embodiments, the present disclosure also provides an active master node. FIG. 19 is a schematic structural diagram of an active master node according to an embodiment of the present disclosure. As shown in FIG. 19, the active master node includes a fourth receiving module 410, a third monitoring module 420, and a second forwarding module 430.

The fourth receiving module 410 is configured to receive an information forwarding request in an active network, where the information forwarding request is transmitted by a second slave node through a first CAN channel and includes a first slave node identifier.

The third monitoring module 420 is configured to monitor, in the standby network, a heartbeat packet and data transmitted through a second CAN channel by a first slave node corresponding to the first slave node identifier.

The second forwarding module 430 is configured to forward the heartbeat packet and the data of the first slave node to the second slave node over the active network when the heartbeat packet and the data transmitted by the first slave node through the second CAN channel are detected in the standby network, so that the second slave node receives the heartbeat packet and the data of the first slave node through the first CAN channel.

Figure 20:
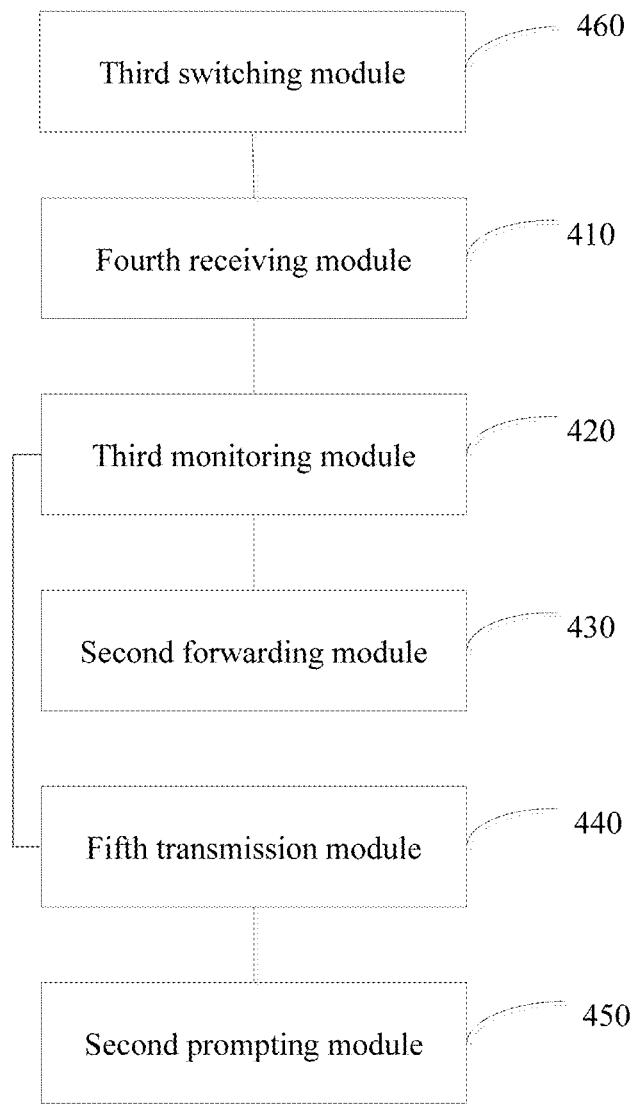
FIG. 20 is a schematic structural diagram of an active master node according to another embodiment of the present disclosure.

FIG. 20 is a schematic structural diagram of an active master node according to another embodiment of the present disclosure. As shown in FIG. 20, on the basis of what is shown in FIG. 19, the active master node further includes a fifth transmission module 440, a second prompting module 450, and a third switching module 460.

The fifth transmission module 440 is configured to transmit, if no heartbeat packet or data transmitted by the first slave node through the second CAN channel is detected in the standby network, a node fault message including the first slave node identifier to the second slave node over the active network.

The second prompting module 450 is configured to transmit the node fault message of the first slave node to an operation monitoring node, and display it to an operator as a prompt of a current fault to be fixed.

The third switching module 460 is configured to switch to a standby master node to perform data exchange with another slave node or another communications network after detecting a fault of the active master node.

It should be noted that the CANopen-based train network data transmission method described above from a perspective of controlling a second slave node side is also applicable to the active master node described in this embodiment of the present disclosure, and is based on similar implementation principles, which are omitted herein.

Accordingly, with the active master node provided in this embodiment of the present disclosure, the information forwarding request including the first slave node identifier and transmitted by the second slave node through the first CAN channel is received in the active network, and the heartbeat packet and the data transmitted through the second CAN channel by the first slave node corresponding to the first slave node identifier is monitored in the standby network. Further, the heartbeat packet and the data of the first slave node are forwarded to the second slave node over the active network when the heartbeat packet and the data transmitted by the first slave node through the second CAN channel are detected in the standby network. In this way, the second slave node receives the heartbeat packet and the data of the first slave node through the first CAN channel. This avoids the problem that slave nodes cannot normally communicate with each other when CAN channel faults of the slave nodes are in different networks. By means of the forwarding by the active master node, normal communication is ensured between the slave nodes, sound operation of an entire train is ensured, and redundancy effects of a train network are improved.

Figure 21:
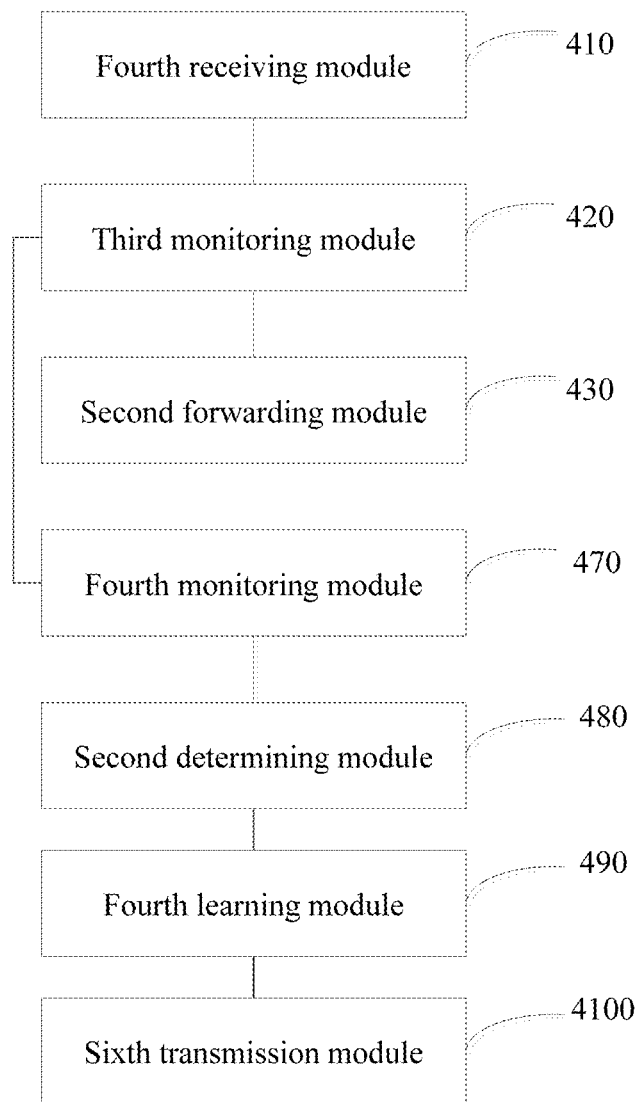
FIG. 21 is a schematic structural diagram of an active master node according to still another embodiment of the present disclosure.

FIG. 21 is a schematic structural diagram of an active master node according to still another embodiment of the present disclosure. As shown in FIG. 21, on the basis of what is shown in FIG. 19, the active master node further includes: a fourth monitoring module 470, a second determining module 480, a fourth determining module 490, and a sixth transmission module 4100.

The fourth monitoring module 470 is configured to monitor, in the active network and based on a preconfigured list of network nodes, a heartbeat packet and data transmitted through a first CAN channel by each slave node related to the active master node.

The second determining module 480 is configured to determine, based on timing of a heartbeat timer that is set corresponding to each slave node and a reception status of the heartbeat packet, whether the first CAN channel of each slave node is faulty.

The fourth determining module 490 is configured to learn, if it is determined that no heartbeat packet of a third slave node is received from the active network within a preset heartbeat period, that a first CAN channel of the third slave node is faulty.

The third monitoring module 420 is further configured to switch to the standby network to monitor a heartbeat packet transmitted by the third slave node through a second CAN channel, where the third slave node is any node that performs information exchange with another communications network.

The fourth receiving module 410 is further configured to receive data from the third slave node in the standby network if the heartbeat packet transmitted by the third slave node through the second CAN channel is received within the preset heartbeat period.

The sixth transmission module 4100 is configured to perform, according to a preset communications protocol for communication with a target communications network, protocol conversion on the data transmitted by the third slave node, and transmit the data to the target communications network.

In an embodiment of the present disclosure, when it is determined that the heartbeat packet of the third slave node is received from the active network within the preset heartbeat period, the fourth receiving module 410 receives, in the active network, the data transmitted by the third slave node, and based on the preset communication protocol for communication with the target communications network, the sixth transmission module 4100 performs protocol conversion on the data transmitted by the third slave node, and transmits the data to the target communications network.

It should be noted that the CANopen-based train network data transmission method described above from a perspective of controlling a second slave node side is also applicable to the active master node described in this embodiment of the present disclosure, and is based on similar implementation principles, which are omitted herein.

Accordingly, the active master node provided in the embodiment of the present disclosure is applicable to not only the communication between slave nodes in a same communications network, but also the communication between slave nodes of different communications networks, thereby ensuring normal communication of slave nodes between different communications network, further ensuring sound operation of the entire train, and improving redundancy effects of the train network.

Figure 22:
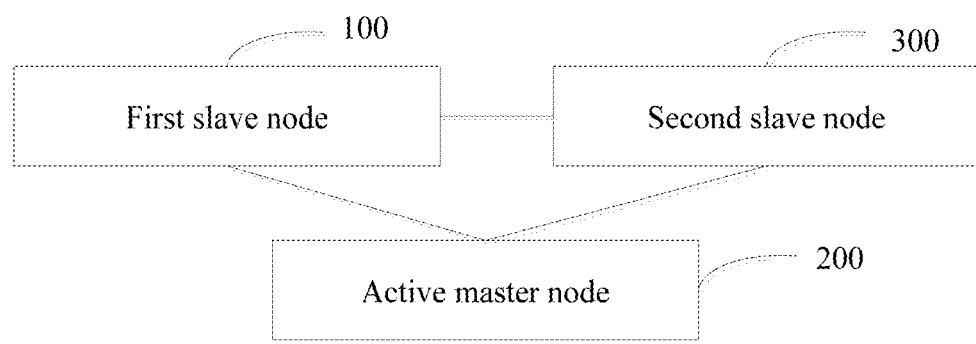
FIG. 22 is a schematic structural diagram of a CANopen-based train network data transmission system according to an embodiment of the present disclosure.

To implement the foregoing embodiments, the present disclosure also provides a CANopen-based train network data transmission system. FIG. 22 is a schematic structural diagram of a CANopen-based train network data transmission system according to an embodiment of the present disclosure. As shown in FIG. 22, the CANopen-based train network data transmission system includes a first slave node 100, an active master node 200, and a second slave node 300.

The first slave node 100 includes the first slave node described in the present disclosure with reference to FIG. 12 and FIG. 13, and is based on similar implementation principles, which are omitted herein.

The active master node 200 includes the active master node described in the present disclosure with reference to FIG. 14 to FIG. 16, and is based on similar implementation principles, which are omitted herein.

The second slave node 300 includes the second slave node described in the present disclosure with reference to FIG. 17 and FIG. 18, and is based on similar implementation principles, which are omitted herein.

Accordingly, the CANopen-based train network data transmission system provided in this embodiment of the present disclosure avoids the problem that slave nodes cannot normally communicate with each other when CAN channel faults of the slave nodes are in different networks. By transmitting a forwarding request the active master node, normal communication is ensured between the slave nodes, sound operation of an entire train is ensured, and redundancy effects of a train network are improved.

Figure 23:
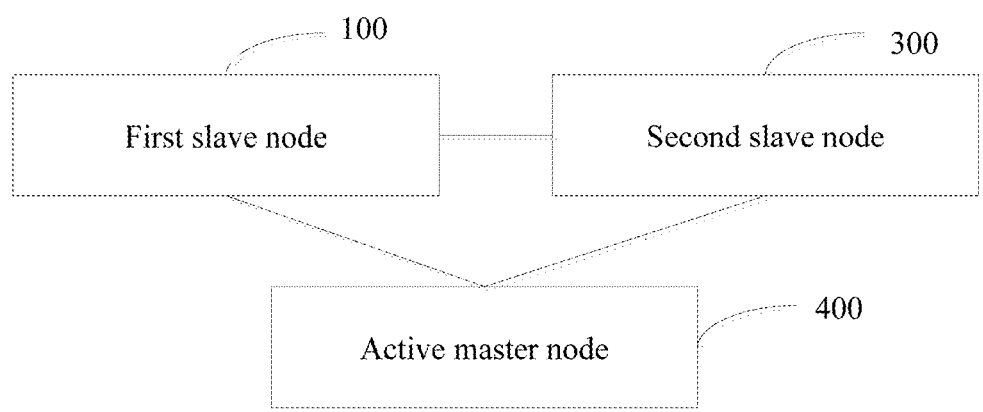
FIG. 23 is a schematic structural diagram of a CANopen-based train network data transmission system according to another embodiment of the present disclosure.

To implement the foregoing embodiments, the present disclosure also provides a CANopen-based train network data transmission system. FIG. 23 is a schematic structural diagram of a CANopen-based train network data transmission system according to another embodiment of the present disclosure. As shown in FIG. 23, the CANopen-based train network data transmission system includes a first slave node 100, an active master node 400, and a second slave node 300.

The first slave node 100 includes the first slave node described in the present disclosure with reference to FIG. 12 and FIG. 13, and is based on similar implementation principles, which are omitted herein.

The active master node 400 includes the active master node described in the present disclosure with reference to FIG. 19 to FIG. 21, and is based on similar implementation principles, which are omitted herein.

The second slave node 300 includes the second slave node described in the present disclosure with reference to FIG. 17 and FIG. 18, and is based on similar implementation principles, which are omitted herein.

Accordingly, the CANopen-based train network data transmission system provided in this embodiment of the present disclosure avoids the problem that slave nodes cannot normally communicate with each other when CAN channel faults of the slave nodes are in different networks. By transmitting a forwarding request to the active master node, normal communication is ensured between the slave nodes, sound operation of an entire train is ensured, and redundancy effects of a train network are improved.

In description of the present disclosure, description of reference terms such as "one embodiment", "some embodiments", "example", "specific example" or "some examples" means including specific features, structures, materials, or features described in the embodiment or example in at least one embodiment or example of the present disclosure. In this specification, schematic descriptions of the foregoing terms are not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

Although the embodiments of the present disclosure are shown and described above, it can be understood that, the foregoing embodiments are exemplary, and cannot be construed as a limitation to the present disclosure. Within the scope of the present disclosure, a person of ordinary skill in the art may make changes, modifications, replacement, and variations to the foregoing embodiments.

What is claimed is:

1. A CANopen-based train network data transmission method for an active master node, comprising:
receiving an information forwarding request in a standby network or an active network, wherein the information forwarding request is transmitted by a first slave node through a second CAN channel and comprises a second slave node identifier;
monitoring, the active network, a heartbeat packet and data transmitted through a first CAN channel by a second slave node corresponding to the second slave node identifier;
forwarding the heartbeat packet and the data of the second slave node to the first slave node over the standby network when the heartbeat packet and the data transmitted by the second slave node through the first CAN channel are detected in the active network, so that the first slave node receives the heartbeat packet and the data of the second slave node through the second CAN channel;
monitoring, over the active network and based on a preconfigured list of network nodes, a heartbeat packet and data transmitted through the first CAN channel by each slave node related to the active master node;
determining based on timing of a heartbeat timer that is set corresponding to each slave node and a reception status of the heartbeat packet, whether the first CAN channel of each slave node is faulty;
determining, when it is determined that no heartbeat packet of a third slave node is received from the active network within a preset heartbeat period, that the first CAN channel of the third slave node is faulty, and switching to the standby network to monitor a heartbeat packet transmitted by the third slave node through a second CAN channel, wherein the third slave node is any node that performs information exchange with another communications network;
receiving data front the third slave node in the standby network when the heartbeat packet transmitted by the third slave node through the second CAN channel is received within the preset heartbeat period;
performing, according to a preset communications protocol for communication with a target communications network, protocol conversion on the data transmitted by the third slave node, and transmitting data after protocol conversion to the target communications network; and
when the heartbeat packet, of the third slave node is received from the active network within the preset heartbeat period, receiving in the active network, the data transmitted by the third slave node, and performing, based on the preset communications protocol for communication with the target communications network, protocol conversion on the data transmitted by the third slave node, and transmitting a converted data to the target communications network.

2. The method according to claim 1, further comprising:
transmitting, if no heartbeat packet or data transmitted by the second slave node through the first CAN channel is detected in the active network, a node fault message comprising the second slave node identifier to the first slave node over the standby network; and transmitting the node fault message of the second slave node to an operation monitoring node, and displaying the node fault message as a prompt of a current fault to be fixed.

3. The method according to claim 1, further comprising: switching to a standby master node to perform data exchange with another slave node or another communications network after detecting a fault of the active master node.

4. A CANopen-based train network data transmission method for an active master node, the active master node comprising a processor and a memory for storing instructions executable by the processor, the method comprising:
receiving, by the processor, an information forwarding request in an active network, wherein the information forwarding request is transmitted by a second slave node through a first CAN channel and comprises a first slave node identifier;
monitoring, by the processor, in a standby network, a heartbeat packet and data transmitted through a second CAN channel by a first slave node corresponding to the first slave node identifier;
forwarding, by the processor, the heartbeat packet and the data of the first slave node to the second slave node over the active network when the heartbeat packet and the data transmitted by the first slave node through the second CAN channel are detected in the standby network, so that the second slave node receives the heartbeat packet and the data of the first slave node through the first CAN channel;
monitoring, by the processor over the active network and based on a preconfigured list of network nodes, a heartbeat packet and data transmitted through a first CAN channel by each slave node related to the active master node;
determining, by the processor, based on timing of a heartbeat timer that is set corresponding to each slave node and a reception status of the heartbeat packet, whether the first CAN channel of each slave node is faulty;
determining, by the processor, if it is determined that no heartbeat packet of a third slave node is received from the active network within a preset heartbeat period, that the first CAN channel of the third slave node is faulty, and switching to the standby network to monitor a heartbeat packet transmitted by the third slave node through a second CAN channel, wherein the third slave node is any node that performs information exchange with another communications network;
receiving by the processor, data from the third slave node over the standby net if the heartbeat packet transmitted by the third slave node through the second CAN channel is received within the preset heartbeat period;
performing, by the processor, according to a preset communications protocol for communication with a target communications network, protocol conversion on the data transmitted by the third slave node, and transmitting, by the processor the data to the target communications network; and
if it is determined that the heartbeat packet of the third slave node is received from the active network within the preset heartbeat period, receiving, by the processor, in the active network, the data transmitted by the third slave node, and based on the preset communications protocol for communication with the target communications network performing, by the processor, protocol conversion on the data transmitted by the third slave node, and transmitting, by the processor, the data to the target communications network.

5. The method according to claim 4, further comprising:
transmitting, by the processor, if no heartbeat packet or data transmitted by the first slave node through the second CAN channel is detected in the standby network, a node fault message comprising the first slave node identifier to the second slave node over the active network; and
transmitting, by the processor, the node fault message of the first slave node to an operation monitoring node, and displaying the node fault message as a prompt of a current fault to be fixed.

6. The method according to claim 4, further comprising:
switching, by the processor, to a standby master node to perform data exchange with another slave node or another communications network after detecting a fault of the active master node.

7. An active master node of a network based on a CANopen protocol, the active master node comprising a processor and a memory for storing instructions executable by the processor, wherein the processor comprises:
a second receiving module, configured to receive an information forwarding request in a standby network or an active network, wherein the information forwarding request is transmitted by a first slave node through a second CAN channel and comprises a second slave node identifier;
a first monitoring module, configured to monitor, in the active network, a heartbeat packet and data transmitted through a first CAN channel by a second slave node corresponding to the second slave node identifier;
a first forwarding module, configured to forward the heartbeat packet and the data of the second slave node to the first slave node over the standby network when the heartbeat packet and the data transmitted by the second slave node through the first CAN channel are detected in the active network, so that the first slave node receives the heartbeat packet and the data of the second slave node through the second CAN channel;
a second monitoring module, configured to monitor, over the active network and based on a preconfigured list of network nodes, a heartbeat packet and data transmitted through a first CAN channel by each slave node related to the active master node;
a first determining module, configured to determine, based on timing of a heartbeat that is set corresponding to each slave node and a reception status of the heartbeat packet, whether the first CAN channel of each slave node is faulty;
a second determining module, configured to determining, if it is determined that no heartbeat packet of a third slave node is received from the active network within a preset heartbeat period, that the first CAN channel of the third slave node is faulty, wherein
the second monitoring module is further configured to switch to the standby network to monitor a heartbeat packet transmitted by the third slave node through a second CAN channel, wherein the third slave node is any node that performs information exchange with another communications network;
the second receiving module is further configured to receive data transmitted by the third slave node over the standby network if the heartbeat packet transmitted by the third slave node through the second CAN channel is received within the preset heartbeat period; and a third transmission module, configured to perform, according to preset communications protocol for communication with a target communications network, protocol conversion on the data transmitted by the third slave node, and transmit the data to the target communications network, wherein if it is determined that the heartbeat packet of the third slave node is received from the active network within the preset heartbeat period, the second receiving module receives, over the active network, the data transmitted by the third slave node, and based on the preset communication protocol for communication with the target communications network, the third transmission module performs protocol conversion on the data transmitted by the third slave node, and transmits the data to the target communications network.

8. The active master node according to claim 7, wherein the processor further comprises:
a second transmission module, configured to transmit, if no heartbeat packet or data transmitted by the second slave node through the first CAN channel is detected in the active network, a node fault message comprising the second slave node identifier to the first slave node over the standby network; and
a first prompting module, configured to transmit the node fault message of the second slave node to an operation monitoring node, and display the node fault message as a prompt of a current fault to be fixed.

9. The active master node according to claim 7, wherein the processor further comprises:
a second switching module, configured to switch to a standby master node to perform data exchange with another slave node or another communications network after detecting a fault of the active master node.

10. A CANopen-based train network data transmission system including the active master node according to claim 7, wherein the processor further comprises:
a first slave node, wherein the first slave node comprises a first switching module, configured to: when a first CAN channel of the first slave node is detected as faulty, switch to a second CAN channel of the first slave node to receive over a standby network a heartbeat packet and data transmitted by another relevant node; a first determining module, configured to learn, if it is determined that no heartbeat packet transmitted by a relevant second slave node is received from the standby network within a preset heartbeat period, that a second CAN channel of the second slave node is faulty; a first transmission module, configured to transmit an information forwarding request comprising a second slave node identifier to the active master node over the standby network, so that the active master node monitors, in an active network, a heartbeat packet and data transmitted by the second slave node through the first CAN channel; a first receiving module, configured to receive, through the second CAN channel of the first slave node, the heartbeat packet and the data of the second slave node that are forwarded by the active master node to the standby network, when the active master node detects in the active network the heartbeat packet and the data transmitted by the second slave node through the first CAN channel; and a second slave node, wherein the second slave node comprises a third determining module, configured to: if it is determined that no heartbeat packet transmitted by the relevant first slave node is received from the active network through a first CAN channel of the second slave node within a preset heartbeat period, determine that the first CAN channel of the first slave node is faulty, and detect that the second CAN channel of the second slave node is faulty; a fourth transmission module, configured to transmit an information forwarding request comprising a first slave node identifier to the active master node over the active network, so that the active master node monitors, in the standby network, a heartbeat packet and data transmitted by the first slave node through the second CAN channel; and a third receiving module, configured to receive, through the first CAN channel of the second slave node, the heartbeat packet and the data of the first slave node that are forwarded by the active master node to the active network when the active master node detects in the standby network the heartbeat packet and the data transmitted by the first slave lode through the second CAN channel.

* * * * *